(12) United States Patent
Fujisawa

(10) Patent No.: US 11,460,327 B2
(45) Date of Patent: Oct. 4, 2022

(54) ROBOT SYSTEM, ROBOT, ROBOT CONTROL DEVICE, ROBOT CONTROL METHOD, AND ENCODER

(71) Applicant: Seiko Epson Corporation, Tokyo (JP)

(72) Inventor: Akihiro Fujisawa, Matsumoto (JP)

(73) Assignee: Seiko Epson Corporation

( * ) Notice: Subject to any disclaimer, the term of this patent is extended or adjusted under 35 U.S.C. 154(b) by 513 days.

(21) Appl. No.: 16/667,998

(22) Filed: Oct. 30, 2019

(65) Prior Publication Data

US 2020/0132513 A1    Apr. 30, 2020

(30) Foreign Application Priority Data

Oct. 31, 2018  (JP) .............................. JP2018-204963

(51) Int. Cl.
    *B25J 9/04*      (2006.01)
    *B25J 9/16*      (2006.01)
    *G01D 5/245*     (2006.01)
    *G01D 5/04*      (2006.01)

(52) U.S. Cl.
    CPC ............ *G01D 5/2452* (2013.01); *B25J 9/044* (2013.01); *B25J 9/1674* (2013.01); *G01D 5/04* (2013.01)

(58) Field of Classification Search
    CPC .... G01D 5/2452; G01D 5/04; G01D 2205/26; G01D 5/3473; B25J 9/044; B25J 9/1674; B25J 13/088; B25J 9/1602; B25J 9/1656; B25J 13/087
    USPC ................................................ 700/245–264
    See application file for complete search history.

(56) References Cited

U.S. PATENT DOCUMENTS

| | | | | |
|---|---|---|---|---|
| 4,608,651 A | * | 8/1986 | Murakami ........... | G05B 19/423 700/250 |
| 5,038,243 A | * | 8/1991 | Gordon ................. | H03M 1/287 341/11 |
| 6,029,099 A | * | 2/2000 | Brown .................... | G06N 20/00 706/26 |
| 6,507,188 B1 | | 1/2003 | Dilger et al. | |
| 7,375,487 B2 | * | 5/2008 | Miyashita ................. | H02P 6/17 318/602 |
| 7,429,844 B2 | * | 9/2008 | Kono ........................ | B25J 9/102 318/625 |

(Continued)

FOREIGN PATENT DOCUMENTS

JP  2002-531858 A    9/2002
JP  2013-104778 A    5/2013

(Continued)

*Primary Examiner* — Jaime Figueroa
(74) *Attorney, Agent, or Firm* — Harness, Dickey & Pierce, P.L.C.

(57) ABSTRACT

A robot system includes: a robot having a main shaft gear attached to a rotary shaft of a drive unit, a first countershaft gear meshing with the main shaft gear, a second countershaft gear meshing with the main shaft gear, and a third countershaft gear meshing with the main shaft gear; and a main shaft phase output unit outputting a phase of the main shaft gear as a first main shaft phase. A phase of the main shaft gear is derived as a second main shaft phase, based on a phase of the first countershaft gear, a phase of the second countershaft gear, and a phase of the third countershaft gear. Processing to stop the drive unit is performed when the first main shaft phase and the second main shaft phase do not coincide with each other.

12 Claims, 9 Drawing Sheets

(56) References Cited

U.S. PATENT DOCUMENTS

| | | | | |
|---|---|---|---|---|
| 8,526,013 | B2* | 9/2013 | Makiuchi | G01D 5/24461 |
| | | | | 356/614 |
| 9,126,333 | B2* | 9/2015 | Tsai | H02K 7/116 |
| 9,267,585 | B2* | 2/2016 | Mihara | F16H 19/08 |
| 9,342,067 | B2* | 5/2016 | Osaka | G05B 19/404 |
| 9,528,855 | B2* | 12/2016 | Houda | G01D 5/12 |
| 9,841,947 | B2* | 12/2017 | Houda | G01D 5/2454 |
| 9,966,816 | B2* | 5/2018 | Kokubo | B25J 13/088 |
| 10,081,102 | B1* | 9/2018 | Berkowitz | F16H 57/12 |
| 10,505,428 | B2* | 12/2019 | Kokubo | G01D 5/2451 |
| 10,598,512 | B2* | 3/2020 | Juang | G01D 5/12 |
| 11,079,257 | B2* | 8/2021 | Osada | G01D 5/145 |
| 11,193,799 | B2* | 12/2021 | Schautt | G01D 5/36 |
| 2006/0192517 | A1* | 8/2006 | Miyashita | H02P 6/17 |
| | | | | 318/652 |
| 2009/0110533 | A1* | 4/2009 | Jinno | A61B 34/70 |
| | | | | 901/31 |
| 2011/0026040 | A1* | 2/2011 | Makiuchi | G01B 7/30 |
| | | | | 356/614 |
| 2014/0084840 | A1* | 3/2014 | Osaka | G05B 19/404 |
| | | | | 318/632 |
| 2014/0107837 | A1* | 4/2014 | Tsai | H02K 7/116 |
| | | | | 700/245 |
| 2014/0290079 | A1* | 10/2014 | Houda | G01D 5/2452 |
| | | | | 33/1 PT |
| 2015/0209958 | A1* | 7/2015 | Hasegawa | B25J 9/102 |
| | | | | 74/416 |
| 2015/0276436 | A1* | 10/2015 | Hasebe | B25J 13/088 |
| | | | | 310/68 B |
| 2016/0365771 | A1* | 12/2016 | Kokubo | B25J 9/1641 |
| 2018/0099422 | A1* | 4/2018 | Yoon | B25J 19/06 |
| 2018/0328763 | A1* | 11/2018 | Schautt | G01D 5/36 |
| 2019/0168389 | A1* | 6/2019 | Shino | B25J 13/088 |
| 2019/0277668 | A1* | 9/2019 | Osada | G01D 5/244 |
| 2020/0130181 | A1* | 4/2020 | Nakata | B25J 9/1635 |
| 2020/0280245 | A1* | 9/2020 | Osada | H02P 6/17 |

FOREIGN PATENT DOCUMENTS

| | | |
|---|---|---|
| JP | 2013-152092 A | 8/2013 |
| JP | 2014-115234 A | 6/2014 |
| JP | 2016-109431 A | 6/2016 |
| JP | 2017-215148 A | 12/2017 |

\* cited by examiner

| PHASE DIFFERENCE BETWEEN MAIN SHAFT GEAR AND FIRST COUNTERSHAFT GEAR | PHASE DIFFERENCE BETWEEN MAIN SHAFT GEAR AND SECOND COUNTERSHAFT GEAR | AMOUNT OF CHANGE IN PHASE OF MAIN SHAFT GEAR | NUMBER OF ROTATIONS OF MAIN SHAFT GEAR |
|---|---|---|---|
| +3 TEETH | +1 TOOTH | 20 TEETH | 1 ROTATION |
| +6 TEETH | +2 TEETH | 40 TEETH | 2 ROTATIONS |
| ... | ... | ... | ... |

| PHASE DIFFERENCE BETWEEN SECOND COUNTERSHAFT GEAR AND FIRST COUNTERSHAFT GEAR | PHASE DIFFERENCE BETWEEN THIRD COUNTERSHAFT GEAR AND FIRST COUNTERSHAFT GEAR | NUMBER OF ROTATIONS OF FIRST COUNTERSHAFT GEAR |
|---|---|---|
| 0 TEETH | 0 TEETH | 0 ROTATIONS |
| -2 TEETH | -6 TEETH | 1 ROTATION |
| -4 TEETH | -12 TEETH | 2 ROTATIONS |
| -6 TEETH | -18 TEETH | 3 ROTATIONS |
| -8 TEETH | -24 TEETH | 4 ROTATIONS |
| -10 TEETH | -30 TEETH | 5 ROTATIONS |
| ... | ... | ... |

ROBOT SYSTEM, ROBOT, ROBOT CONTROL DEVICE, ROBOT CONTROL METHOD, AND ENCODER

The present application is based on, and claims priority from, JP Application Serial Number 2018-204963, filed Oct. 31, 2018, the disclosure of which is hereby incorporated by reference herein in its entirety.

BACKGROUND

1. Technical Field

The present disclosure relates to a robot system, a robot, a robot control device, a robot control method, and an encoder.

2. Related Art

Research and development of an encoder has been underway.

In this connection, an encoder which has a main shaft gear and three countershaft gears, detects a phase of the main shaft gear and a phase of each of the three countershaft gears, derives a number of rotations of the main shaft gear, based on a combination of the detected phases of the three countershaft gears, and derives a multiple rotation quantity of the main shaft gear, based on the derived number of rotations and the detected phase of the main shaft gear, is known. This encoder is described in detail in JP-A-2013-104778. In this specification, the phase of a gear when the gear is rotated means the remainder of dividing the angle of rotation of the gear by 360 degrees. Also, in this specification, the number of rotations of the gear when the gear is rotated means the quotient of dividing the angle of rotation of the gear by 360 degrees. Moreover, in this specification, the multiple rotation quantity of the gear means the angle of rotation of the gear. That is, in this specification, the multiple rotation quantity of the main shaft gear is the sum of the phase of the main shaft gear and the number of rotations of the main shaft gear.

Such a related-art encoder, in some cases, erroneously detects a phase different from the actual phase of the main shaft as the phase of the main shaft when an abnormality about the main shaft occurs. When a phase different from the actual phase is erroneously derived as the phase of the main shaft, the encoder may derive a multiple rotation quantity different from the actual multiple rotation quantity of the main shaft as the multiple rotation quantity of the main shaft. However, the encoder cannot determine whether a phase different from the actual phase of the main shaft is detected or not.

SUMMARY

A robot system according to an aspect of the present disclosure includes: a robot having a main shaft gear attached to a rotary shaft of a drive unit, a first countershaft gear meshing with the main shaft gear, a second countershaft gear meshing with the main shaft gear, and a third countershaft gear meshing with the main shaft gear; and a main shaft phase output unit outputting a phase of the main shaft gear as a first main shaft phase. A phase of the main shaft gear is derived as a second main shaft phase, based on a phase of the first countershaft gear, a phase of the second countershaft gear, and a phase of the third countershaft gear. Processing to stop the drive unit is performed when the first main shaft phase and the second main shaft phase do not coincide with each other.

DESCRIPTION OF EXEMPLARY EMBODIMENTS

Embodiment

Figure 1:
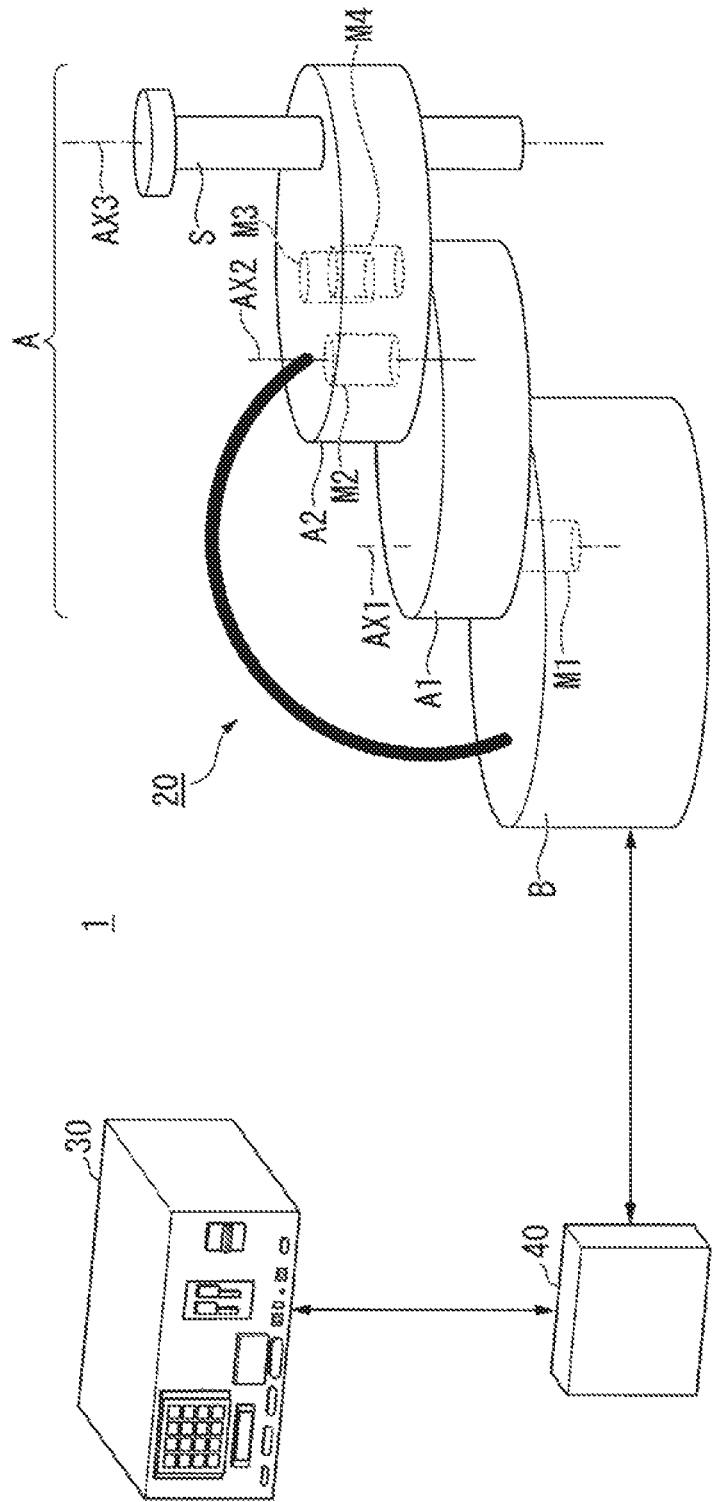
FIG. 1 shows an example of the configuration of a robot system 1 according to an embodiment.

An embodiment of the present disclosure will now be described with reference to the drawings.

Outline of Robot System

First, an outline of a robot system according to the embodiment will be described.

The robot system has an encoder, a robot having the encoder, and a control unit. The encoder has a main shaft gear attached to a rotary shaft of a drive unit, a first countershaft gear meshing with the main shaft gear, a second countershaft gear meshing with the main shaft gear, and a third countershaft gear meshing with the main shaft gear.

More specifically, the control unit performs first processing. The first processing is processing including eleventh processing, twelfth processing, thirteenth processing, and fourteenth processing. The eleventh processing refers to processing to derive a first number of rotations based on the first countershaft gear and the second countershaft gear. The twelfth processing refers to processing to derive a second number of rotations based on the second countershaft gear and the third countershaft gear. The thirteenth processing refers to processing to drive a third number of rotations based on the third countershaft gear and the first countershaft gear. The fourteenth processing refers to processing to stop the drive unit when two or more of the first number of rotations, the second number of rotations, and the third number of rotations do not coincide with each other.

When two or more of the first number of rotations, the second number of rotations, and the third number of rotations do not coincide with each other, it is highly likely that an abnormality about the countershaft gear has occurred in the encoder. More specifically, in this case, it is highly likely that an abnormality about a part or all of the first to third countershaft gears has occurred in the encoder. When an abnormality about the countershaft gear has occurred in the encoder, the multiple rotation quantity of the main shaft gear derived based on information outputted from the encoder may be a value different from the actual multiple rotation quantity. This is because the multiple rotation quantity of the main shaft gear derived based on the information is the value of the phase of the main shaft gear added up with the number of rotations of the main shaft gear, and the number of rotations of the main shaft gear is derived based on the phase of each of the first to third countershaft gears. When the multiple rotation quantity of the main shaft gear derived based on the information is a value different from the actual multiple rotation quantity, the robot may malfunction.

That is, the robot system determines whether the derived multiple rotation quantity of the main shaft gear is a value different from the actual multiple rotation quantity or not, based on the first processing performed by the control unit. When the derived multiple rotation quantity of the main shaft gear is a value different from the actual multiple rotation quantity, that is, when two or more of the first number of rotations, the second number of rotations, and the third number of rotations do not coincide with each other, the robot system stops the drive unit. Thus, the robot system can restrain the robot from malfunctioning.

The robot system may also have a main shaft phase output unit. The main shaft phase output unit outputs the phase of the main shaft gear as a first main shaft phase. In this case, the control unit performs third processing. The third processing is processing including thirty-first processing and thirty-second processing. The thirty-first processing refers to processing to derive the phase of the main shaft gear as a second main shaft phase, based on the phase of the first countershaft gear, the phase of the second countershaft gear, and the phase of the third countershaft gear. The thirty-second processing refers to processing to stop the drive unit when the first main shaft phase and the second main shaft phase do not coincide with each other.

When the first main shaft phase and the second main shaft phase do not coincide with each other, it is highly likely that an abnormality about the main shaft gear or the countershaft gear has occurred in the encoder. When an abnormality about the main shaft gear or the countershaft gear has occurred in the encoder, the multiple rotation quantity of the main shaft gear derived based on information outputted from the encoder may be a value different from the actual multiple rotation quantity. This is because the multiple rotation quantity of the main shaft gear derived based on the information is the value of the phase of the main shaft gear added up with the number of rotations of the main shaft gear, and the number of rotations of the main shaft gear is derived based on the phase of each of the first to third countershaft gears. When the multiple rotation quantity of the main shaft gear derived based on the information is a value different from the actual multiple rotation quantity, malfunction may occur.

That is, the robot system determines whether the derived multiple rotation quantity of the main shaft gear is a value different from the actual multiple rotation quantity or not, based on the third processing performed by the control unit. When the derived multiple rotation quantity of the main shaft gear is a value different from the actual multiple rotation quantity, that is, when the first main shaft phase and the second main shaft phase do not coincide with each other, the robot system stops the drive unit. Thus, the robot system can restrain the robot from malfunctioning.

Also, when the control unit performs both of the first processing and the third processing, the robot system can determine which of the main shaft gear and the countershaft gear has an abnormality in the encoder.

Hereinafter, the configuration of such a robot system and processing including the first processing and the third processing, of the processing performed by the control unit in the robot system, will be described in detail. The control unit may be provided in the robot, may be provided in a robot control device controlling the robot, may be provided in an information processing device serving as a relay between the robot and the robot control device, or may be provided in the encoder. As an example, the case where the control unit is provided in the robot control device will be described below.

Configuration of Robot System

First, the configuration of a robot system 1 according to the embodiment will be described with reference to FIG. 1.

FIG. 1 shows an example of the configuration of the robot system 1 according to the embodiment. The robot system 1 is an example of the foregoing robot system.

The robot system 1 includes a robot 20, a robot control device 30, and an information processing device 40. In the robot system 1, a part or all of the robot 20, the robot control device 30, and the information processing device 40 may be formed as separate units from each other or may be formed as one unit. In the example shown in FIG. 1, all of the robot 20, the robot control device 30, and the information processing device 40 are formed as separate units from each other. The robot system 1 may also be configured without having the information processing device 40.

The robot 20 is a SCARA robot. The SCARA robot is also referred to as a horizontally articulated robot. The robot 20 may be a robot of another type such as a vertically articulated robot or linear motion robot, instead of the SCARA robot. The vertically articulated robot may be a single-arm robot having one arm or may be a multi-arm robot having two or more arms. A multi-arm robot having two arms is referred to as a dual-arm robot. The robot 20 is an example of the foregoing robot.

The robot 20 has a base B and a moving section A.

The base B supports the moving section A. In the example shown in FIG. 1, the base B is installed at a predetermined installation surface. The installation surface is, for example, a floor surface of a room where the robot 20 carries out work. As the installation surface, another surface may be used, such as a wall surface of the room, a ceiling surface of the room, a top surface of a table, a surface of a jig, or a surface of a stand, instead of the floor surface.

In the description below, for the sake of convenience of the description, a direction toward the installation surface from the base B, of directions orthogonal to the installation surface, is referred to as downward or a downward direction. Also, in the description below, for the sake of convenience of the description, a direction opposite to the downward direction is referred to as upward or an upward direction.

The moving section A has a first arm A1 supported by the base B in such a way as to be able to pivot around a first pivot axis AX1, a second arm A2 supported by the first arm A1 in such a way as to be able to pivot around a second pivot axis AX2, and a shaft S supported by the second arm A2 in such a way as to be able to pivot around a third pivot axis AX3 and to translationally move in the axial direction of the third pivot axis AX3.

The shaft S is a cylindrical shaft member. A ball screw groove, not illustrated, and a spline groove, not illustrated, are provided on a circumferential surface of the shaft S. In the example shown in FIG. 1, the shaft S is provided, penetrating an end part opposite to the first arm A1, of the end parts of the second arm A2, in up-down directions.

An external device can be attached to a distal end of the shaft S. The external device that can be attached to the distal end of the shaft S is an end effector or the like. The distal end of the shaft S is the lower end part, of the two ends parts of the shaft S. The distal end of the shaft S shown in FIG. 1 has nothing attached thereto. The end effector attached to the distal end of the shaft S is, for example, an end effector that can hold an object with a finger part. The end effector attached to the distal end of the shaft S may also be an end effector that can hold an object by air suction, magnetic attraction or the like. The end effector attached to the distal end of the shaft S may also be an end effector that cannot hold an object. In this embodiment, holding an object means turning an object into a state where the object can be lifted up.

In this example, the first arm A1 pivots around the first pivot axis AX1 and moves in a horizontal direction. In this embodiment, the horizontal direction is a direction orthogonal to the up-down directions. Pivoting means a motion of rotating around an axis and includes the case where the angle of rotation is less than 360 degrees and the case where the angle of rotation is 360 degrees or greater. Also, the pivoting is not limited to a motion of rotating in one direction and includes a motion of rotating in both directions.

The first arm A1 is driven to pivot around the first pivot axis AX1 by a first drive unit M1 provided in the base B. The first drive unit M1 is an actuator causing the first arm A1 to pivot around the first pivot axis AX1. The first drive unit M1 is, for example, a motor. That is, in this embodiment, the first pivot axis AX1 is an imaginary axis coincident with a rotary shaft of the first drive unit M1. As the first drive unit M1, another actuator causing the first arm A1 to pivot may be employed, instead of the motor.

In this example, the second arm A2 pivots around the second pivot axis AX2 and moves in the horizontal direction.

The second arm A2 is driven to pivot around the second pivot axis AX2 by a second drive unit M2 provided in the second arm A2. The second drive unit M2 causes the second arm A2 to pivot around the second pivot axis AX2. The second drive unit M2 is, for example, a motor. That is, in this embodiment, the second pivot axis AX2 is an imaginary axis coincident with a rotary shaft of the second drive unit M2. As the second drive unit M2, another actuator causing the second arm A2 to pivot may be employed, instead of the motor.

The second arm A2 also has a third drive unit M3 and a fourth drive unit M4 and supports the shaft S.

The third drive unit M3 causes a ball screw nut provided at an outer peripheral part of the ball screw groove of the shaft S to pivot via a timing belt or the like. Thus, the third drive unit M3 causes the shaft S to move in the up-down direction. The third drive unit M3 is, for example, a motor. As the third drive unit M3, another actuator causing the shaft S to move in the up-down directions may be employed, instead of the motor.

The fourth drive unit M4 causes a ball spline nut provided at an outer peripheral part of the spline groove of the shaft S to pivot via a timing belt or the like. Thus, the fourth drive unit M4 causes the shaft S to pivot around the third pivot axis AX3. The fourth drive unit M4 is, for example, a motor. As the fourth drive unit M4, another actuator causing the shaft S to pivot around the third pivot axis AX3 may be employed, instead of the motor.

In this way, the third pivot axis AX3 is an imaginary axis coincident with the center axis of the shaft S.

Hereinafter, the case where all of the first to fourth drive units M1 to M4 have the same configuration will be described as an example. A part or all of the first to fourth drive units M1 to M4 may have different configurations from each other. In the description below, the first to fourth drive units M1 to M4 are collectively referred to as a drive unit M unless it is necessary to distinguish these drive units from each other.

The drive unit M has an encoder EC outputting a multiple rotation quantity of the rotary shaft of the drive unit M to another device. That is, in this embodiment, the drive unit M is a servo motor. In FIG. 1, the encoder EC is not illustrated in order not to complicate the illustration. The multiple rotation quantity of the rotary shaft refers to the multiple rotation quantity of a gear attached to the rotary shaft and rotating with the rotary shaft.

The encoder EC is a batteryless encoder. More specifically, the encoder EC has a plurality of gears and a sensor detecting a phase of each of the plurality of gears. Thus, a device which derives the multiple rotation quantity of the rotary shaft of the drive unit M can derive the multiple rotation quantity of the rotary shaft of the drive unit M, based on a combination of the phases of the plurality of gears. This device is, for example, the encoder EC, the robot control device 30, the information processing device and the like. That is, the encoder EC can hold the multiple rotation quantity of the rotary shaft without having a battery, even when electricity supply to the encoder EC is stopped. The encoder EC is an example of the foregoing encoder. A configuration example of the plurality of gears provided in the encoder EC will now be described.

Figure 2:
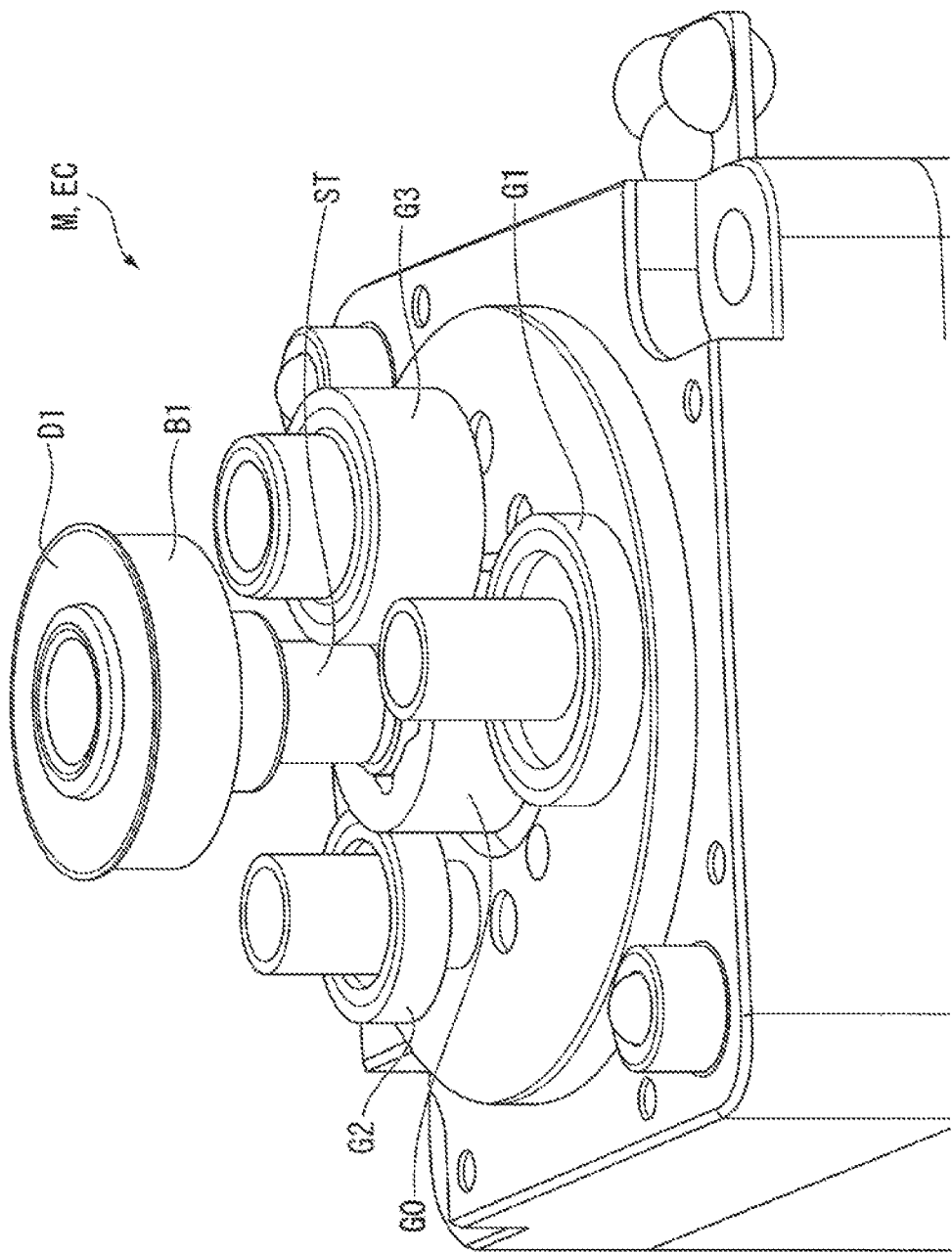
FIG. 2 shows a configuration example of a plurality of gears provided in an encoder EC.

FIG. 2 shows a configuration example of the plurality of gears provided in the encoder EC. A rotary shaft ST shown in FIG. 2 is an example of the rotary shaft of the drive unit M. In FIG. 2, a cover of the encoder EC, a sensor provided in the encoder EC, a substrate for controlling the sensor, a wiring provided in the encoder EC, and the like, are not illustrated in order to clarify the configuration example of the plurality of gears provided in the encoder EC.

The encoder EC has four gears as the plurality of gears provided in the encoder EC, that is, a main shaft gear G0, a first countershaft gear G1, a second countershaft gear G2, and a third countershaft gear G3. The encoder EC may have a configuration having one or more other gears in addition to the four gears.

The main shaft gear G0 is attached to the rotary shaft ST, as shown in FIG. 2. In this case, the phase of the main shaft gear G0 coincides with the phase of the rotary shaft ST. Also, in this case, the number of rotations of the main shaft gear G0 coincides with the number of rotations of the rotary shaft ST. Moreover, in this case, the multiple rotation quantity of the main shaft gear G0 coincides with the multiple rotation quantity of the rotary shaft ST. The main shaft gear G0 is an example of the foregoing main shaft gear.

The first to third countershaft gears G1 to G3 are provided in the encoder EC in such a way that the teeth of the first to third countershaft gears G1 to G3 respectively mesh with the teeth of the main shaft gear G0. Also, the first to third countershaft gears G1 to G3 are provided in the encoder EC in such a way that the teeth of the first to third countershaft gears G1 to G3 do not mesh with each other. The first countershaft gear G1 is an example of the foregoing first countershaft gear. The second countershaft gear G2 is an example of the foregoing second countershaft gear. The third countershaft gear G3 is an example of the foregoing third countershaft gear.

In this way, the encoder EC has the main shaft gear G0, the first countershaft gear G1, the second countershaft gear G2, and the third countershaft gear G3. Thus, the encoder EC can hold the multiple rotation quantity of the rotary shaft ST without having a battery, even when electricity supply to the encoder EC is stopped, as described.

The combination of the number of teeth of the main shaft gear G0 and the number of teeth of each of the first to third countershaft gears G1 to G3 is, for example, a combination of four integers relatively prime to each other. The combination of four integers relatively prime to each other is, in other words, a combination of four integers having no greatest common divisor other than 1. Hereinafter, the case where the number of teeth of the main shaft gear G0, the number of teeth of the first countershaft gear G1, the number of teeth of the second countershaft gear G2, and the number of teeth of the third countershaft gear G3 are 20, 17, 19, and 23 in order, will be described as an example. That is, in this embodiment, the number of teeth of the main shaft gear G0 is 20, the number of teeth of the first countershaft gear G1 is 17, the number of teeth of the second countershaft gear G2 is 19, and the number of teeth of the third countershaft gear G3 is 23. The combination of the number of teeth of the main shaft gear G0 and the number of teeth of each of the first to third countershaft gears G1 to G3 may be a combination of values resulting from multiplying four integers relatively prime to each other by a predetermined real number. However, in this case, the predetermined real number needs to be a real number decided in such a way that teeth can be formed on each of the main shaft gear G0, the first countershaft gear G1, the second countershaft gear G2, and the third countershaft gear G3. Therefore, it is desirable that the predetermined real number is an integer.

The combination of the number of teeth of the main shaft gear G0 and the number of teeth of each of the first to third countershaft gears G1 to G3 is also decided according to the number of rotations of the main shaft gear G0 that should be held by the encoder EC. For example, with the combination of the first countershaft gear G1 having the number of teeth of 17 and the second countershaft gear G2 having the number of teeth of 19, the number of rotations up to 17×19=323 can be held as the number of rotations of the main shaft gear G0.

The encoder EC also has a main shaft phase output unit S0, a first phase output unit S1, a second phase output unit S2, and a third phase output unit S3. In FIG. 2, the main shaft phase output unit S0, the first phase output unit S1, the second phase output unit S2, and the third phase output unit S3 are not illustrated in order to clarify the configuration example of the four gears provided in the encoder EC.

The main shaft phase output unit S0 outputs the phase of the main shaft gear G0. The main shaft phase output unit S0 is, for example, a sensor which detects the phase of the main shaft gear G0 and outputs the phase as a value representing a first main shaft phase. The sensor may be an optical sensor, magnetic sensor, resolver, potentiometer, or another sensor that can detect the phase. In the example shown in FIG. 2, the encoder EC has an optical sensor as the main shaft phase output unit S0. Therefore, at the distal end of the rotary shaft ST shown in FIG. 2, an optical disk D1 provided with a plurality of slit arrays made up of a plurality of slits laid out in a circumferential direction is provided via a pedestal B1. The main shaft phase output unit S0 is an example of the foregoing main shaft phase output unit.

The main shaft phase output unit S0 detects the phase of the main shaft gear G0 and outputs first main shaft phase information representing the detected first main shaft phase to the robot control device 30 via the information processing device 40.

The first phase output unit S1 is a sensor which detects the phase of the first countershaft gear G1 and outputs the phase as a first countershaft phase. The sensor may be an optical sensor, magnetic sensor, resolver, potentiometer, or another sensor that can detect the phase. In the description below, the case where the sensor is a magnetic sensor is described as an example.

The first phase output unit S1 outputs first countershaft phase information representing the detected first countershaft phase to the robot control device 30 via the information processing device 40.

The second phase output unit S2 is a sensor which detects the phase of the second countershaft gear G2 and outputs the phase as a second countershaft phase. The sensor may be an optical sensor, magnetic sensor, resolver, potentiometer, or another sensor that can detect the phase. In the description below, the case where the sensor is a magnetic sensor is described as an example.

The second phase output unit S2 outputs second countershaft phase information representing the detected second countershaft phase to the robot control device 30 via the information processing device 40.

The third phase output unit S3 is a sensor which detects the phase of the third countershaft gear G3 and outputs the phase as a third countershaft phase. The sensor may be an optical sensor, magnetic sensor, resolver, potentiometer, or another sensor that can detect the phase. In the description below, the case where the sensor is a magnetic sensor is described as an example.

The third phase output unit S3 outputs third countershaft phase information representing the detected third countershaft phase to the robot control device 30 via the information processing device 40.

Back to FIG. 1, the robot control device 30 controls the robot 20. In the example shown in FIG. 1, the robot control device 30 controls the robot 20 via the information processing device 40.

The robot control device 30 acquires the first main shaft phase information from the main shaft phase output unit S0 of the encoder EC. The robot control device 30 also acquires the first countershaft phase information from the first phase output unit S1 of the encoder EC. The robot control device 30 also acquires the second countershaft phase information from the second phase output unit S2 of the encoder EC. The robot control device 30 also acquires the third countershaft phase information from the third phase output unit S3 of the encoder EC.

The robot control device 30 derives the multiple rotation quantity of the main shaft gear G0, based on the first main shaft phase information, the first countershaft phase information, the second countershaft phase information, and the third countershaft phase information thus acquired.

More specifically, the robot control device 30 derives the number of rotations of the main shaft gear G0, based on the combination of the first countershaft phase, the second countershaft phase, and the third countershaft phase. The robot control device 30 then derives the value of the derived number of rotations added up with the first main shaft phase, as the multiple rotation quantity of the main shaft gear G0. The robot control device 30 specifies the derived multiple rotation quantity as the multiple rotation quantity of the rotary shaft of the drive unit M. The robot control device 30 controls the drive unit M, based on the specified multiple rotation quantity, and thus causes the robot 20 to operate. In this embodiment, the explanation of the processing in which the robot control device 30 causes the robot 20 to operate based on the multiple rotation quantity is omitted.

The robot control device 30 performs first processing. The first processing is processing including eleventh processing, twelfth processing, thirteenth processing, and fourteenth processing. In the embodiment, the eleventh processing refers to processing to derive a first number of rotations based on the first countershaft gear G1 and the second countershaft gear G2. In the embodiment, the twelfth processing refers to processing to derive a second number of rotations based on the second countershaft gear G2 and the third countershaft gear G3. In the embodiment, the thirteenth processing refers to processing to drive a third number of rotations based on the third countershaft gear G3 and the first countershaft gear G1. In the embodiment, the fourteenth processing refers to processing to stop the drive unit M when two or more of the first number of rotations, the second number of rotations, and the third number of rotations do not coincide with each other. In the embodiment, the first processing may also include another processing in addition to the eleventh processing, the twelfth processing, the thirteenth processing, and the fourteenth processing. In the embodiment, that two or more of three values do not coincide with each other means that two values included in a combination, of combinations of two values that can be selected from among the three values, do not coincide with each other, or that the three values do not coincide with each other. As the processing to stop the drive unit M, for example, when the robot 20 has a power shutoff unit, processing to shut off the electricity supply to the robot 20 may be performed to shut off the electricity supply to the drive unit M, thus stopping the rotary motion of the drive unit M. Alternatively, for example, when the robot 20 is equipped with an electromagnetic brake or the like, processing to turn on the electromagnetic brake may be performed to stop the rotary motion of the drive unit M.

When two or more of the first number of rotations, the second number of rotations, and the third number of rotations do not coincide with each other, it is highly likely that an abnormality about the countershaft gear has occurred in the encoder EC. More specifically, in this case, it is highly likely that an abnormality about a part or all of the first to third countershaft gears G1 to G3 has occurred in the encoder EC. The abnormality about the countershaft gear in the encoder EC is, for example, wear of the teeth of a part or all of the first to third countershaft gears G1 to G3, damage or loss of the teeth, failure of a part or all of the first to third phase output units S1 to S3, and the like. When an abnormality about the countershaft gear has occurred in the encoder EC, the multiple rotation quantity of the main shaft gear derived based on information outputted from the encoder EC may be a value different from the actual multiple rotation quantity. This is because the multiple rotation quantity of the main shaft gear G0 derived based on the information is the value of the main shaft phase added up with the number of rotations of the main shaft gear G0, and the number of rotations of the main shaft gear G0 is derived based on the first to third countershaft phases, as described above. When the multiple rotation quantity of the main shaft gear derived based on the information is a value different from the actual multiple rotation quantity, the robot 20 may malfunction.

That is, the robot control device 30 determines whether the number of rotations of the main shaft gear G0 is a number of rotations different from the actual number of rotations or not, by the first processing. This means that the robot control device 30 determines whether the derived multiple rotation quantity of the main shaft gear G0 is a multiple rotation quantity different from the actual multiple rotation quantity or not, by the first processing. When the derived multiple rotation quantity of the main shaft gear G0 is a value different from the actual multiple rotation quantity, that is, when two or more of the first number of rotations, the second number of rotations, and the third number of rotations do not coincide with each other, the robot control device 30 stops the drive unit M of the robot 20. Thus, the operation of the robot 20 can be stopped and the robot system 1 can restrain the robot 20 from malfunctioning.

The robot control device 30 also performs third processing. The third processing is processing including thirty-first processing and thirty-second processing. In the embodiment, the thirty-first processing refers to processing to derive the phase of the main shaft gear G0 as a second main shaft phase, based on the first countershaft phase, the second countershaft phase, and the third countershaft phase. In the embodiment, the thirty-second processing refers to processing to stop the drive unit M when the first main shaft phase and the second main shaft phase do not coincide with each other. In the embodiment, the third processing may include another processing in addition to the thirty-first processing and the thirty-second processing.

When the first main shaft phase and the second main shaft phase do not coincide with each other, it is highly likely that an abnormality about the main shaft gear G0 or an abnormality about a part or all of the first to third countershaft gears G1 to G3 has occurred in the encoder EC. The abnormality about the main shaft gear G0 in the encoder EC is, for example, wear of the teeth of the main shaft gear G0, damage or loss of the teeth, failure of the main shaft phase output unit S0, and the like. When such an abnormality has occurred in the encoder EC, the multiple rotation quantity of the main shaft gear G0 derived based on information outputted from the encoder EC may be a value different from the actual multiple rotation quantity. This is because the multiple rotation quantity of the main shaft gear derived based on the information is the value of the first main shaft phase added up with the number of rotations of the main shaft gear G0, and the number of rotations of the main shaft gear G0 is derived based on the first to third countershaft phases. When the multiple rotation quantity of the main shaft gear G0 derived based on the information is a value different from the actual multiple rotation quantity, the accuracy of work carried out by the robot 20 may drop due to malfunction, as described above.

That is, the robot control device 30 determines whether the derived multiple rotation quantity of the main shaft gear G0 is a value different from the actual multiple rotation quantity or not, by the third processing. When the derived multiple rotation quantity of the main shaft gear G0 is a value different from the actual multiple rotation quantity, that is, when the first main shaft phase and the second main shaft phase do not coincide with each other, the robot control device 30 stops the drive unit M. Thus, the operation of the robot 20 can be stopped and the robot system 1 can restrain the robot 20 from malfunctioning.

The robot control device 30 may also be configured to perform processing including one of the first processing and the third processing described above, or may be configured to perform processing including both the first processing and the third processing. The case where the robot control device 30 performs processing including both the first processing and the third processing will now be described as an example. In this case, the robot control device 30 can determine which of the main shaft gear G0 and the countershaft gear has an abnormality in the encoder EC. The countershaft gear refers to a part or all of the first to third countershaft gears G1 to G3. The robot control device 30 is an example of the foregoing robot control device.

The information processing device 40 is an information processing device serving as a relay between the robot 20 and the robot control device 30. More specifically, the information processing device 40 relays transmission of various signals between the robot 20 and the robot control device 30. Thus, the information processing device 40 can perform processing according to various signals between the robot 20 and the robot control device 30, independently of the robot control device 30. Therefore, for example, when the robot 20 performs an unintended operation, the information processing device 40 can stop the robot 20 more securely. That is, the information processing device 40 can improve the safety of the robot system 1. In this embodiment, the information processing device 40 will not be described further in detail. The information processing device 40 is an example of the foregoing information processing device.

Hardware Configuration of Robot Control Device

Figure 3:
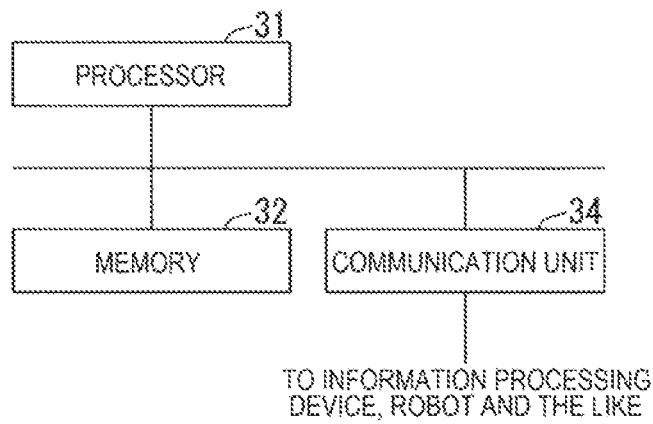
FIG. 3 shows an example of the hardware configuration of a robot control device 30.

The hardware configuration of the robot control device 30 will now be described with reference to FIG. 3. FIG. 3 shows an example of the hardware configuration of the robot control device 30. The robot control device 30 has, for example, a processor 31, a memory 32, and a communication unit 34. These components are coupled in such a way as to be able to communicate with each other via a bus. The robot control device 30 also communicates with the robot 20 via the communication unit 34. As described above, this communication is relayed by the information processing device 40. The robot control device 30 may also have, for example, a circuit for controlling a switch coupling each drive unit to the power supply, that is, a motor driver, in addition to the above components.

The processor 31 is, for example, a CPU (central processing unit). As the processor 31, another processor such as an FPGA (field-programmable gate array) may be used. The processor 31 executes various commands stored in the memory 32 provided in the robot control device 30.

The memory 32 includes, for example, an HDD (hard disk drive), SSD (solid-state drive), EEPROM (electrically erasable programmable read-only memory), ROM (read-only memory), RAM (random access memory) or the like. The memory 32 may also be an external storage device coupled via a USB (universal serial bus) or similar digital input/output port, instead of being built in the robot control device 30. The memory 32 may also be provided in a device other than the robot control device 30. For example, the memory 32 may be provided in the robot 20, the information processing device 40, the encoder EC, a cloud computer or the like. The memory 32 stores various kinds of information processed by the processor 31, various commands executable by the computer, various images and the like. The various commands are, for example, operation programs, codes and the like of the robot 20.

The communication unit 34 includes, for example, a USB or similar digital input/output port, an Ethernet (trademark registered) port, and the like.

The robot control device 30 may also have an input device such as a keyboard, mouse, or touchpad. The robot control device 30 may also have a display device having a liquid crystal display panel, organic EL (electroluminescence) display panel or the like.

Functional Configuration of Robot Control Device

Figure 4:
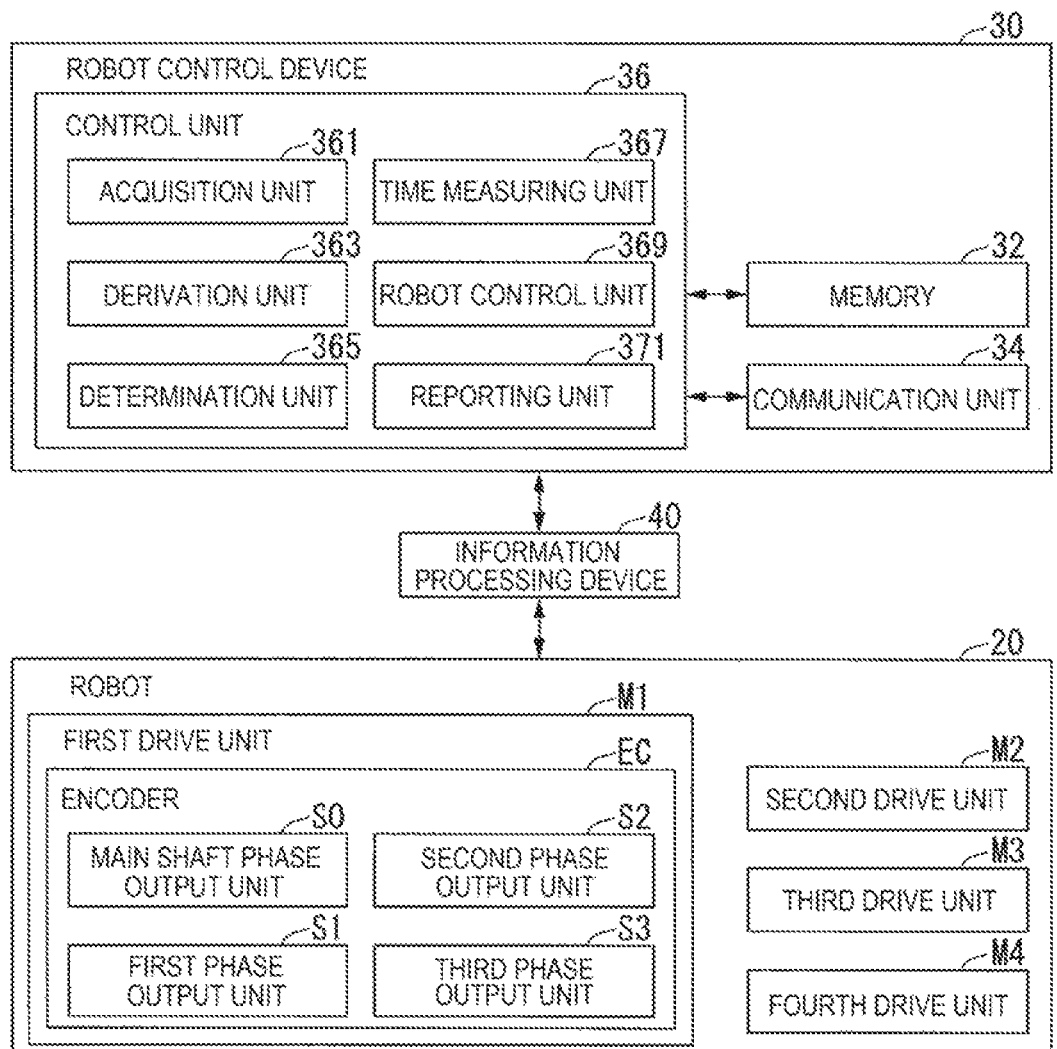
FIG. 4 shows an example of the functional configuration of the robot control device 30.

The functional configuration of the robot control device 30 will now be described with reference to FIG. 4. FIG. 4 shows an example of the functional configuration of the robot control device 30. The robot control device 30 has the memory 32, the communication unit 34, and a control unit 36. As described above, in the embodiment, the first to fourth drive units M1 to M4 have the same configuration. Therefore, in FIG. 4, in order to simplify the illustration, the main shaft phase output unit S0, the first phase output unit S1, the second phase output unit S2, and the third phase output unit S3 provided in each of the second to fourth drive units M2 to M4 are not illustrated. The control unit 36 performs similar processing to each of the first to fourth drive units M1 to M4. Therefore, hereinafter, the processing performed to each of the first to fourth drive units M1 to M4 by the control unit 36 will be described, using the processing performed to the first drive unit M1 by the control unit 36 as an example.

The control unit 36 controls the entirety of the robot control device 30. The control unit 36 has an acquisition unit 361, a derivation unit 363, a determination unit 365, a time measuring unit 367, a robot control unit 369, and a reporting unit 371. These functional units provided in the control unit 36 are implemented, for example, by the processor 31 executing various commands stored in the memory 32. A part or all of these functional units may be a hardware functional unit such as an LSI (large-scale integrated) circuit or ASIC (application-specific integrated circuit).

The acquisition unit 361 acquires first main shaft phase information from the main shaft phase output unit S0 of the first drive unit M1. The acquisition unit 361 also acquires first countershaft phase information from the first phase output unit S1 of the first drive unit M1. The acquisition unit 361 also acquires second countershaft phase information from the second phase output unit S2 of the first drive unit M1. The acquisition unit 361 also acquires third countershaft phase information from the third phase output unit S3 of the first drive unit M1.

The derivation unit 363 performs various kinds of derivation processing performed by the robot control device 30. For example, based on three phases represented by information acquired by the acquisition unit 361 from the encoder EC of the first drive unit M1, the derivation unit 363 derives the number of rotations of the main shaft gear G0 provided in the encoder EC. This information is the first countershaft phase information, the second countershaft phase information, and the third countershaft phase information. The three phases are the first countershaft phase, the second countershaft phase, and the third countershaft phase. The derivation unit 363 derives the value of the derived number of rotations of the main shaft gear G0 added up with the first main shaft phase represented by the first main shaft phase information acquired from the encoder EC by the acquisition unit 361, as the multiple rotation quantity of the main shaft gear G0.

The acquisition unit 361 also derives each of a first number of rotations, a second number of rotations, and a third number of rotations for the encoder EC of the first drive unit M1. The first number of rotations of the encoder EC is the number of rotations of the main shaft gear G0 of the encoder EC derived based on the first countershaft phase of the encoder EC and the second countershaft phase of the encoder EC. The second number of rotations of the encoder EC is the number of rotations of the main shaft gear G0 of the encoder EC derived based on the second countershaft phase of the encoder EC and the third countershaft phase of the encoder EC. The third number of rotations of the encoder EC is the number of rotations of the main shaft gear G0 of the encoder EC derived based on the third countershaft phase of the encoder EC and the first countershaft phase of the encoder EC.

The derivation unit 363 also derives the phase of the main shaft gear G0 as a second main shaft phase, based on the first countershaft phase, the second countershaft phase, and the third countershaft phase, for the encoder EC of the first drive unit M1.

The determination unit 365 performs various kinds of determination processing performed by the robot control device 30.

The determination unit 365 determines whether a first abnormality condition is satisfied or not, for example, based on each of the first number of rotations, the second number of rotations, and the third number of rotations derived by the derivation unit 363 for the first drive unit M1. The first abnormality condition is that two or more of the first number of rotations, the second number of rotations, and the third number of rotations do not coincide with each other. The first abnormality condition may include another condition in addition to this. Also, the first abnormality condition may be that two of the first number of rotations, the second number of rotations, and the third number of rotations do not coincide with each other. That is, the first abnormality condition may be that the two of the first number of rotations and the second number of rotations do not coincide with each other, that the two of the second number of rotations and the third number of rotations do not coincide with each other, or that the two of the third number of rotations and the first number of rotations do not coincide with each other. The first abnormality condition may also be a combination of two of these three conditions.

The determination unit 365 also determines whether a third abnormality condition is satisfied or not, for example, based on the information representing the first main shaft phase acquired by the acquisition unit 361 and the second main shaft phase derived by the derivation unit 363. The third abnormality condition is that the first main shaft phase and the second main shaft phase do not coincide with each other. The third abnormality condition may include another condition in addition to this.

The time measuring unit 367 measures the elapsed time.

The robot control unit 369 controls the robot 20.

The robot control unit 369 causes the robot 20 to carry out predetermined work, for example, based on an operation program stored in advance in the memory 32.

The robot control unit 369 stops the drive unit M, for example, when the determination unit 365 determines that the first abnormality condition is satisfied.

The robot control unit 369 stops the drive unit M, for example, when the determination unit 365 determines that the third abnormality condition is satisfied.

The reporting unit 371 reports information representing that the first abnormality condition is satisfied, when the determination unit 365 determines that the first abnormality condition is satisfied. The reporting unit 371 reports information representing that the third abnormality condition is satisfied, when the determination unit 365 determines that the third abnormality condition is satisfied.

For example, when reporting certain information, the reporting unit 371 emits a sound representing the information from a speaker and thus reports the information. In this case, the reporting unit 371 may be configured to emit the sound from a speaker provided in the robot control device 30 so as to report the information, or may be configured to emit the sound from a speaker provided in another device coupled in such a way as to be able to communicate with the robot control device 30 so as to report the information. When reporting the information, the reporting unit 371 also turns on a lamp that emits light representing the information, and thus reports the information. The lamp is, for example, a rotating warning lamp. In this case, the reporting unit 371 may be configured to turn on the lamp provided in the robot control device 30 so as to report the information, or may be configured to turn on a lamp provided in another device coupled in such a way as to be able to communicate with the robot control device 30 so as to report the information. The reporting unit 371 also displays, for example, an image representing the information on a display and thus reports the information. In this case, the reporting unit 371 may be configured to display the image on a display provided in the robot control device 30 so as to report the information, or may be configured to display the image on a display provided in another device coupled in such a way as to be able to communication with the robot control device 30 so as to report the information. The reporting unit 371 also outputs the information to another device and thus reports the information. The reporting unit 371 may also be configured to report the information by a method other than these.

Processing Including Both First Processing and Third Processing

Figure 5:
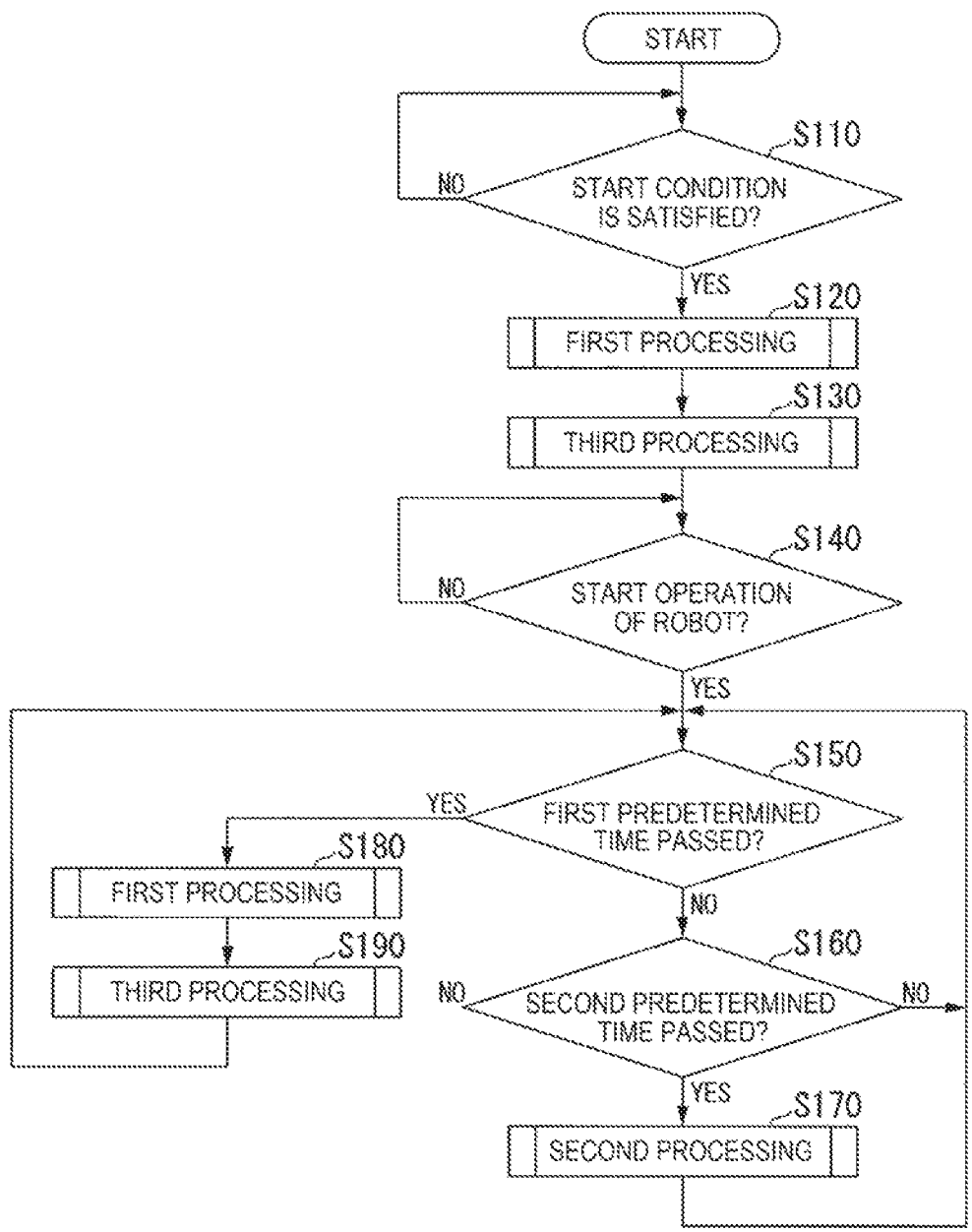
FIG. 5 shows an example of a flow of processing including both first processing and third processing, of the processing performed by the robot control device 30.

The processing including both the first processing and the third processing, of the processing performed by the robot control device 30, will now be described. FIG. 5 shows an example of the flow of the processing including both the first processing and the third processing, of the processing performed by the robot control device 30. In the example shown in FIG. 5, this processing includes second processing in addition to the first processing and the third processing.

The second processing is processing to determine whether, as the amount of change in the phase of each of the three countershaft gears provided in the encoder EC of the drive unit M, an amount of change different from the actual amount of change is derived or not. Details of the second processing will be described later. The processing including both the first processing and the third processing, of the processing performed by the robot control device 30, may include another processing instead of the second processing or may include another processing in addition to the second processing.

The robot control unit 369 waits until a predetermined start condition is satisfied at a timing before the robot control unit 369 causes the robot 20 to start operating (step S110).

The timing before the robot control unit 369 causes the robot 20 to start operating is, in other words, a timing before the robot control device 30 accepts an operation to execute an operation program causing the robot 20 to operate. The timing before the robot control unit 369 causes the robot 20 to start operating is also a timing before the robot 20 starts operating. That is, in the embodiment, a period when the robot 20 is operating is a period when the operation program is being executed. Moreover, the timing when the robot control unit 369 causes the robot 20 to start operating may be a timing when a current flows through the drive unit M in order to drive the drive unit M. For example, in the case of a three-phase AC system, this timing may be a timing when a current flows through each phase. Also, when an electromagnetic brake or the like is installed, this timing may be a timing when a voltage or current with which the electromagnetic brake turns off is provided.

The start condition is, for example, that the power supply of the robot 20 is turned on. For example, the start condition is that a current flows through a switch that can physically couple or cut off the substrate of the robot control device 30 and the power supply, to or from the robot control device 30, or that the voltage across the switch becomes equal to the power-supply voltage. Instead of this, the start condition may be that electric power is supplied to the substrate of a part or all of the robot 20, the information processing device 40, and the encoder EC. For example, the start condition may be that, through the substrate of a part of these, a higher current value flows than when the substrate is in standby state. The start condition may also be that the robot control device 30 accepts an operation that causes the robot control device 30 to start the processing in the flowchart shown in FIG. 5. As the start condition, another condition may be employed.

When robot control unit 369 determines that the start condition is satisfied at the timing before the robot control unit 369 causes the robot 20 to start operating (YES in step S110), the control unit 36 performs the first processing (step S120). The flow of the first processing and the agent performing each processing included in the first processing will be described later.

Next, the control unit 36 performs the third processing (step S130). The flow of the third processing and the agent performing each processing included in the third processing will be described later.

The control unit 36 may be configured to perform the processing of step S120 and the processing of step S130 in parallel or may be configured to perform the processing of step S120 and the processing of step S130 in the reverse order of the order shown in FIG. 5.

Next, the robot control unit 369 waits until starting the operation of the robot 20 (step S140). For example, when the robot control unit 369 accepts an operation to execute an operation program that causes the robot 20 to operate, the robot control unit 369 determines that the operation of the robot 20 is to be started. At this time, a current flows through the drive unit M.

The time measuring unit 367 starts measuring time, when the robot control unit 369 determines that the operation of the robot 20 is to be started (YES in step S140). The time measuring unit 367 determines whether or not a first predetermined time has passed since the immediately previous timing of starting time measurement (step S150). The first predetermined time is, for example, one minute. The first predetermined time may be shorter than one minute or longer than one minute. The first predetermined time is an example of the predetermined time.

When the time measuring unit 367 determines that the first predetermined time has not passed since the immediately previous timing of starting time measurement (NO in step S150), the time measuring unit 367 determines whether a second predetermined time has passed since the timing or not (step S160). The second predetermined time is, for example, 0.001 seconds. The second predetermined time may be shorter than 0.001 seconds or longer than 0.001 seconds.

When the time measuring unit 367 determines that the second predetermined time has not passed since the immediately previous timing of starting time measurement (NO in step S160), the time measuring unit 367 shifts to step S150 and determines again whether the first predetermined time has passed since the timing or not.

Meanwhile, when the time measuring unit 367 determines that the second predetermined time has passed since the immediately previous timing of starting time measurement (YES in step S160), the control unit 36 performs the second processing (step S170). The flow of the second processing and the agent performing each processing included in the second processing will be described later.

After the processing of step S170, the time measuring unit 367 shifts to step S150 and determines again whether or not the first predetermined time has passed since the immediately previous timing of starting time measurement.

Meanwhile, when the time measuring unit 367 determines that the first predetermined time has passed since the immediately previous timing of starting time measurement (YES in step S150), the time measuring unit 367 ends the time measurement started immediately before. The control unit 36 then performs the first processing (step S180). The processing of step S180 is similar to the processing of step S120 and therefore will not be described further.

Next, the control unit 36 performs the third processing (step S190). The processing of step S190 is similar to the processing of step S130 and therefore will not be described further.

The control unit 36 may be configured to perform the processing of step S180 and the processing of step S190 in parallel or may be configured to perform the processing of step S180 and the processing of step S190 in the reverse order of the order shown in FIG. 5.

After the processing of step S190, the time measuring unit 367 shifts to step S150 and starts measuring time again. The time measuring unit 367 then determines whether or not the first predetermined time has passed since the immediately previous timing of starting time measurement.

As described above, in the example shown in FIG. 5, the robot control device 30 performs the first processing and the third processing during the period until the robot 20 starts moving after the power supply of the robot 20 is turned on. The robot control device 30 may be configured to perform the first processing and the third processing at another timing or during another period. When the robot control device 30 does not perform the first processing, steps S120 and S180 are omitted. When the robot control device 30 does not perform the third processing, steps S130 and S190 are omitted.

In the example shown in FIG. 5, after performing the first round of the first processing, the robot control device 30 performs the first processing every time the first predetermined time passes. Therefore, even when the derived multiple rotation quantity of the main shaft gear G0 is a value different from the actual multiple rotation quantity during the operation of the robot 20, the robot control device 30 can stop the robot 20 by stopping the drive unit M. Thus, the robot control device 30 can more securely restrain the robot 20 from malfunctioning. That the first predetermined time passes is an example of the predetermined condition. The robot control device 30 may be configured to perform the processing of step S180 when a condition different from that the first predetermined time passes is satisfied in step S150, and to perform the processing of step S160 when this condition is not satisfied. The condition is, for example, that the number of times the robot 20 performs work reaches a predetermined number of times, or the like.

Of the processing in the flowchart shown in FIG. 5, the processing of step S150, the processing of step S180, and the processing of step S190 may be omitted. Thus, the robot control device 30 can reduce the load of the processing performed by the robot control device 30 during the operation of the robot 20. However, in the case where the robot control device 30 does not omit but executes the processing of step S180 and the processing of step S190, the robot control device 30 can restrain the robot 20 from malfunctioning even when an abnormality about the main shaft gear G0 or the countershaft gear occurs in the encoder EC during the operation of the robot 20.

In the example shown in FIG. 5, the robot control device 30 may be configured to perform the processing of step S170 when a condition different from that the second predetermines time passes is satisfied in step S160, and to perform the processing of step S150 when this condition is not satisfied. The condition is, for example, that the number of times the robot 20 performs work reaches a predetermined number of times, or the like.

The processing of a part or all of the processing in the flowchart shown in FIG. 5 may be performed by a part or all of the robot 20, the information processing device 40, and the encoder EC, instead of the robot control device 30, or may be performed by a part or all of the robot 20, the information processing device 40, and the encoder EC, in addition to the robot control device 30. In this case, the device performing the processing of a part or all of the processing in the flowchart shown in FIG. 5 has the function of performing this processing, of the functions of the control unit 36. In the robot system 1, this device is the robot 20, the information processing device 40, the encoder EC, or the like. However, another device may be employed instead of these. In this case, the robot system 1 has this another device.

Processing of Step S120

Figures 6, 7:
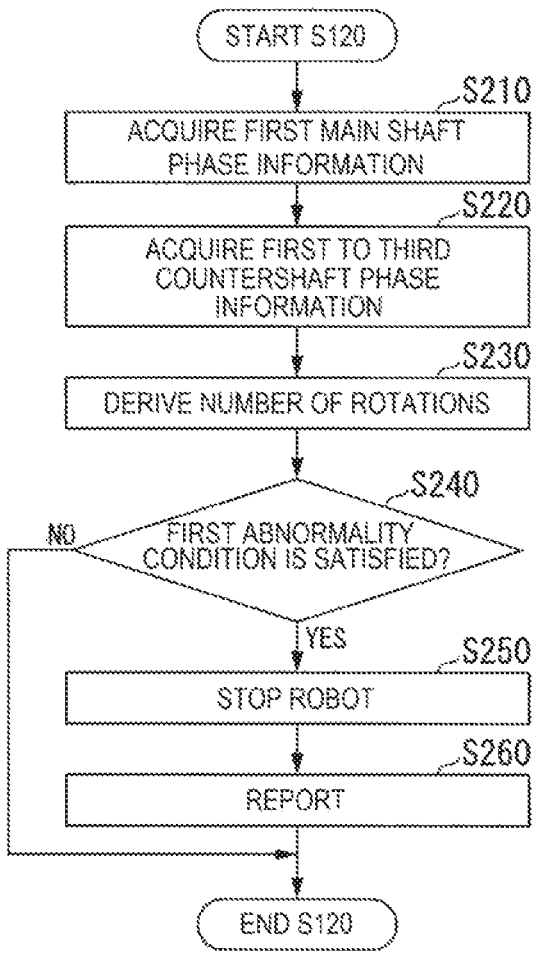
FIG. 6 shows an example of a flow of processing of step S120 shown in FIG. 5.
FIG. 7 shows an example of first correspondence information.

The processing of step S120 shown in FIG. 5, that is, the first processing, will now be described. FIG. 6 shows an example of the flow of the processing of step S120 shown in FIG. 5. The processing in the flowchart shown in FIG. 6 is performed for each of the four drive units M. Therefore, the processing of step S120 will be described, using the processing for the first drive unit M1 as an example.

The acquisition unit 361 acquires first main shaft phase information from the main shaft phase output unit S0 of the encoder EC provided in the first drive unit M1 (step S210).

Next, the acquisition unit 361 acquires first countershaft phase information from the first phase output unit S1 of the encoder EC provided in the first drive unit M1, acquires second countershaft phase information from the second phase output unit S2 of the encoder EC, and acquires third countershaft phase information from the third phase output unit S3 of the encoder EC (step S220).

Next, the derivation unit 363 derives the number of rotations of the main shaft gear G0, based on the three pieces of countershaft phase information acquired in step S220 (step S230). The three pieces of countershaft phase information are the first countershaft phase information, the second countershaft phase information, and the third countershaft phase information.

The processing of step S230 will now be described.

First, an example of the method by which the derivation unit 363 derives the number of rotations of the main shaft gear G0, based on the first countershaft phase information, the second countershaft phase information, and the third countershaft phase information, will be described.

When each of two gears meshes with one other gear, the combination of the phases of the two gears can correspond one-to-one to the number of rotations of the one gear. Therefore, the combination of the first countershaft phase and the second countershaft phase can correspond to the number of rotations of the main shaft gear G0. The combination of the second countershaft phase and the third countershaft phase can correspond to the number of rotations of the main shaft gear G0. The combination of the third countershaft phase and the first countershaft phase can correspond to the number of rotations of the main shaft gear G0. Therefore, the derivation unit 363 can derive the number of rotations of the main shaft gear G0, based on the combination of the first countershaft phase and the second countershaft phase. The derivation unit 363 can also derive the number of rotations of the main shaft gear G0, based on the combination of the second countershaft phase and the third countershaft phase. The derivation unit 363 can derive the number of rotations of the main shaft gear G0, based on the combination of the third countershaft phase and the first countershaft phase.

Thus, the derivation unit 363 derives the number of rotations of the main shaft gear G0 as the first number of rotations, based on the first countershaft phase, the second countershaft phase, and first correspondence information stored in advance in the memory 32. The first correspondence information is information of the correspondence between the combination of the first countershaft phase and the second countershaft phase, and the number of rotations of the main shaft gear G0. However, in order to derive the first number of rotations as an integer, the derivation unit 363, for example, discards the numbers below the decimal point of the number of rotations of the main shaft gear G0 corresponding to the combination of the first countershaft phase and the second countershaft phase in the first correspondence information. For the handling of the numbers below the decimal point of the number of rotations in the first correspondence information, another method such as rounding off to the nearest integer may be employed.

FIG. 7 shows an example of the first correspondence information. In the example shown in FIG. 7, the first correspondence information is a table showing the correspondence between the combination of the first countershaft phase and the second countershaft phase, and the number of rotations of the main shaft gear G0. This table also shows the correspondence between information representing the number of rotations of the main shaft gear G0, information representing the amount of change in the phase of the main shaft gear G0 corresponding to the number of rotations, information representing the phase difference between the main shaft gear G0 and the first countershaft gear G1, and information representing the phase difference between the main shaft gear G0 and the second countershaft gear G2. The phase difference between the main shaft gear G0 and the first countershaft gear G1 can be used instead of the first countershaft phase. Therefore, the table includes the information representing the phase difference between the main shaft gear G0 and the first countershaft gear G1, instead of information representing the first countershaft phase. The phase difference between the main shaft gear G0 and the second countershaft gear G2 can be used instead of the second countershaft phase. Therefore, the table includes the information representing the phase difference between the main shaft gear G0 and the second countershaft gear G2, instead of information representing the second countershaft phase.

In the table shown in FIG. 7, the information representing the amount of change in the phase of the main shaft gear G0 is expressed by the number of teeth by which the main shaft gear G0 has moved from the starting point according to the number of rotations of the main shaft gear G0. For example, in the embodiment, the number of teeth of the main shaft gear G0 is 20. Therefore, the table shows that the amount of change in the phase of the main shaft gear G0 when the number of rotations of the main shaft gear G0 is one is "20 teeth".

In the table shown in FIG. 7, the information representing the phase difference between the main shaft gear G0 and the first countershaft gear G1 is expressed by the number of teeth of the first countershaft gear G1. For example, in the embodiment, the number of teeth of the main shaft gear G0 is 20 and the number of teeth of the first countershaft gear G1 is 17. Therefore, when the number of rotations of the main shaft gear G0 is one, the phase of the first countershaft gear G1 is greater than the phase of the main shaft gear G0 by three teeth of the first countershaft gear G1. That is, the first countershaft gear G1 rotates more than the main shaft gear G0 by three teeth of the first countershaft gear G1. In other words, the phase difference between the main shaft gear G0 and the first countershaft gear G1 is +3 teeth of the first countershaft gear G1. Thus, the table shows that the information representing this phase difference is "+3 teeth".

In the table shown in FIG. 7, the information representing the phase difference between the main shaft gear G0 and the second countershaft gear G2 is expressed by the number of teeth of the second countershaft gear G2. For example, in the embodiment, the number of teeth of the main shaft gear G0 is 20 and the number of teeth of the second countershaft gear G2 is 19. Therefore, when the number of rotations of the main shaft gear G0 is one, the phase of the second countershaft gear G2 is greater than the phase of the main shaft gear G0 by one tooth of the second countershaft gear G2. That is, the second countershaft gear G2 rotates more than the main shaft gear G0 by one tooth of the second countershaft gear G2. In other words, the phase difference between the main shaft gear G0 and the second countershaft gear G2 is +1 tooth of the second countershaft gear G2. Thus, the table shows that the information representing this phase difference is "+1 tooth".

The table shown in FIG. 7 shows only the cases where the amount of change in the phase of the main shaft gear G0 is 20 teeth and 40 teeth. However, the table is simply an example given to simplify the description. The amount of change may be an integer or a real number. The amount of change in the phase of the main shaft gear G0 may also be expressed by other information representing the amount of change, instead of the number of teeth of the main shaft gear G0. The table may also show other information representing the phase difference between the main shaft gear G0 and the first countershaft gear G1, instead of the phase difference expressed by the number of teeth of the first countershaft gear G1. The table may also show other information representing the phase difference between the main shaft gear G0 and the second countershaft gear G2, instead of the phase difference expressed by the number of teeth of the second countershaft gear G2. As the first correspondence information, other information representing the correspondence between the combination of the first countershaft phase and the second countershaft phase, and the number of rotations of the main shaft gear G0, may be employed, instead of the table.

The derivation unit 363 derives the number of rotations of the main shaft gear G0 as the first number of rotations, using such first correspondence information. Specifically, the derivation unit 363 detects the number of rotations of the main shaft gear G0 corresponding to the combination of the first countershaft phase and the second countershaft phase from the first correspondence information stored in advance in the memory 32 and thus derives this number of rotations as the first number of rotations.

The derivation unit 363 also derives the number of rotations of the main shaft gear G0 as the second number of rotations, based on the second countershaft phase, the third countershaft phase, and second correspondence information stored in advance in the memory 32. The second correspondence information is information of the correspondence between the combination of the second countershaft phase and the third countershaft phase, and the number of rotations of the main shaft gear G0. The configuration of the second correspondence information is similar to the configuration of the first correspondence information and therefore will not be described further. That is, in the embodiment, the second correspondence information is a table showing the correspondence between information representing the number of rotations of the main shaft gear G0, information representing the amount of change in the phase of the main shaft gear G0 corresponding to the number of rotations, information representing the phase difference between the main shaft gear G0 and the second countershaft gear G2, and information representing the phase difference between the main shaft gear G0 and the third countershaft gear G3.

The derivation unit 363 derives the number of rotations of the main shaft gear G0 as the second number of rotations, using such second correspondence information. Specifically, the derivation unit 363 detects the number of rotations of the main shaft gear G0 corresponding to the combination of the second countershaft phase and the third countershaft phase from the second correspondence information stored in advance in the memory 32 and thus derives this number of rotations as the second number of rotations.

The derivation unit 363 also derives the number of rotations of the main shaft gear G0 as the third number of rotations, based on the third countershaft phase, the first countershaft phase, and third correspondence information stored in advance in the memory 32. The third correspondence information is information of the correspondence between the combination of the third countershaft phase and the first countershaft phase, and the number of rotations of the main shaft gear G0. The configuration of the third correspondence information is similar to the configuration of the first correspondence information and therefore will not be described further. That is, in the embodiment, the third correspondence information is a table showing the correspondence between information representing the number of rotations of the main shaft gear G0, information representing the amount of change in the phase of the main shaft gear G0 corresponding to the number of rotations, information representing the phase difference between the main shaft gear G0 and the third countershaft gear G3, and information representing the phase difference between the main shaft gear G0 and the first countershaft gear G1.

The derivation unit 363 derives the number of rotations of the main shaft gear G0 as the third number of rotations, using such third correspondence information. Specifically, the derivation unit 363 detects the number of rotations of the main shaft gear G0 corresponding to the combination of the third countershaft phase and the first countershaft phase from the third correspondence information stored in advance in the memory 32 and thus derives this number of rotations as the third number of rotations.

After the processing of step S230, the determination unit 365 determines whether the first abnormality condition is satisfied or not (step S240). The first abnormality condition in the embodiment is that two or more of the first number of rotations, the second number of rotations, and the third number of rotations do not coincide with each other. That is, the determination unit 365 determines whether the first abnormality condition is satisfied or not, based on the first number of rotations, the second number of rotations, and the third number of rotations derived in step S230.

The first abnormality condition may be that two of the first number of rotations, the second number of rotations, and the third number of rotations do not coincide with each other, as described above. In this case, the robot control device 30 may be configured not to derive the number of rotations that is not selected as the two of the first number of rotations, the second number of rotations, and the third number of rotations.

When the determination unit 365 determines that the first abnormality condition is not satisfied (NO in step S240), the robot control unit 369 ends the processing of step S120, that is, the first processing. The processing to end the first processing in this case may be performed by a functional unit other than the robot control unit 369, of the functional units provided in the control unit 36.

Meanwhile, when the determination unit 365 determines that the first abnormality condition is satisfied (YES in step S240), the robot control unit 369 stops the first drive unit M1 (step S250). For example, when stopping the first drive unit M1, the robot control unit 369 causes a power shut-off unit, provided in the robot 20 but not illustrated, to shut off the electricity supply to the first drive unit M1. The power shutoff unit is a member that shuts off the electricity supply to the first drive unit M1, and is, for example, a relay switch. As the power shutoff unit, another switching element may be employed instead of the relay switch.

Next, the reporting unit 371 reports information representing that the first abnormality condition is satisfied for the first drive unit M1 (step S260). The robot control unit 369 then ends the processing of step S120, that is, the first processing. At this time, the robot control unit 369 ends the processing without executing the rest of the processing of FIG. 5. At this time, the robot control unit 369 may also execute a flow for abnormality occurrence, for example, processing to record the abnormality.

The foregoing processing of step S230 is an example of each of the eleventh processing, the twelfth processing, and the thirteenth processing. The foregoing processing of steps S240 to S250 is an example of the fourteenth processing. That is, the robot control device performs the first processing including the eleventh processing, the twelfth processing, and the thirteenth processing. Thus, the robot control device 30 can restrain the robot 20 from malfunctioning.

The robot control device 30 calculates three numbers of rotations, that is, the first number of rotations, the second number of rotations, and the third number of rotations, as the number of rotations of the main shaft gear G0, as described above. This means that the robot control device 30 monitors that a number of rotations different from the actual number of rotations is derived as the number of rotations of the main shaft gear G0, by two or more systems. That is, the robot control device 30 according to the embodiment employs multiple measures of monitoring and thus restrains the robot 20 from malfunctioning due to the derivation of a multiple rotation quantity different from the actual multiple rotation quantity as the multiple rotation quantity of the main shaft gear G0 based on the information outputted from the encoder EC. In the embodiment, the system means a combination of two countershaft gears that can be selected from among the first to third countershaft gears G1 to G3 of the encoder EC.

Processing of Step S130

Figures 8, 9:
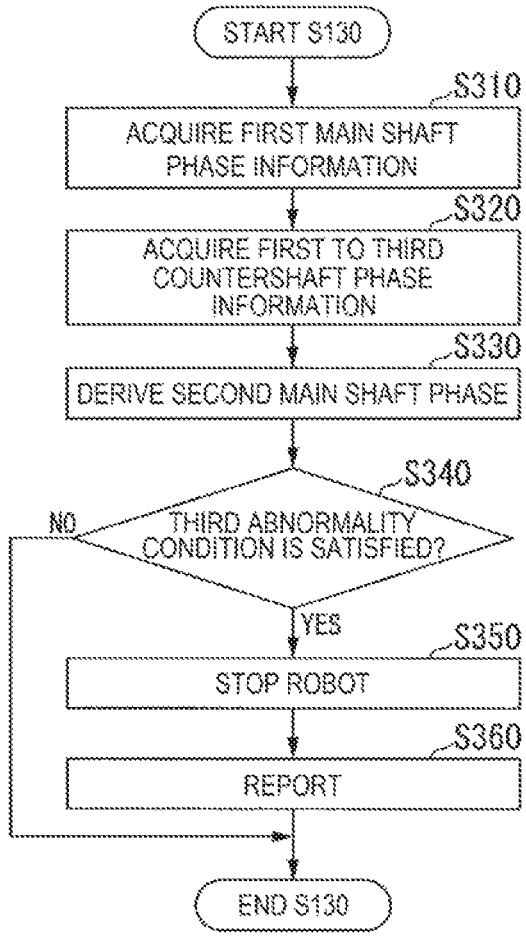
FIG. 8 shows an example of a flow of processing of step S130 shown in FIG. 5.
FIG. 9 shows an example of fourth correspondence information.

The processing of step S130 in FIG. 5, that is, the third processing, will now be described. FIG. 8 shows an example of the flow of the processing of step S130 shown in FIG. 5. The processing in the flowchart shown in FIG. 8 is performed for each of the four drive units M. Therefore, the processing of step S130 will be described, using the processing for the first drive unit M1 as an example.

The acquisition unit 361 acquires first main shaft phase information from the main shaft phase output unit S0 of the encoder EC provided in the first drive unit M1 (step S310). The processing of step S310 is similar to the processing of step S210 shown in FIG. 6 and therefore will not be described further. The robot control device 30 may be configured to omit the processing of step S310 when using the first main shaft phase information acquired by the processing of step S120, in the processing of step S130.

Next, the acquisition unit 361 acquires first countershaft phase information from the first phase output unit S1 of the encoder EC provided in the first drive unit M1, acquires second countershaft phase information from the second phase output unit S2 of the encoder EC, and acquires third countershaft phase information from the third phase output unit S3 of the encoder EC (step S320). The processing of step S320 is similar to the processing of step S220 shown in FIG. 6 and therefore will not be described further. The robot control device 30 may be configured to omit the processing of step S320 when using the first countershaft phase information, the second countershaft phase information, and the third countershaft phase information acquired by the processing of step S120, in the processing of step S130.

Next, the derivation unit 363 derives the phase of the main shaft gear G0 as a second main shaft phase, based on the three pieces of countershaft phase information acquired in step S320 (step S330). The three pieces of countershaft phase information are the first countershaft phase information, the second countershaft phase information, and the third countershaft phase information.

The processing of step S330 will now be described.

First, an example of the method by which the derivation unit 363 derives the second main shaft phase, based on the first countershaft phase information, the second countershaft phase information, and the third countershaft phase information, will be described.

The teeth of each of the first countershaft gear G1, the second countershaft gear G2, and the third countershaft gear G3 mesh with the teeth of the main shaft gear G0. Therefore, the combination of the second countershaft phase and the third countershaft phase can correspond to the number of rotations of the first countershaft gear G1. Therefore, the derivation unit 363 can derive the number of rotations of the first countershaft gear G1, based on the combination of the second countershaft phase and the third countershaft phase.

Thus, the derivation unit 363 derives the number of rotations of the first countershaft gear G1, based on the second countershaft phase, the third countershaft phase, and fourth correspondence information stored in advance in the memory 32. The fourth correspondence information is information of the correspondence between the combination of the second countershaft phase and the third countershaft phase, and the number of rotations of the first countershaft gear G1. However, in order to derive the number of rotations of the first countershaft gear G1 as an integer, the derivation unit 363, for example, discards the numbers below the decimal point of the number of rotations of the first countershaft gear G1 corresponding to the combination of the second countershaft phase and the third countershaft phase in the fourth correspondence information. For the handling of the numbers below the decimal point of the number of rotations in the fourth correspondence information, another method such as rounding off to the nearest integer may be employed.

FIG. 9 shows an example of the fourth correspondence information. In the example shown in FIG. 9, the fourth correspondence information is a table showing the correspondence between the combination of the second countershaft phase and the third countershaft phase, and the number of rotations of the first countershaft gear G1. This table also shows the correspondence between information representing the number of rotations of the first countershaft gear G1, information representing the phase difference between the second countershaft gear G2 and the first countershaft gear G1, and information representing the phase difference between the third countershaft gear G3 and the first countershaft gear G1. The phase difference between the second countershaft gear G2 and the first countershaft gear G1 can be used instead of the second countershaft phase. Therefore, the table includes the information representing the phase difference between the second countershaft gear G2 and the first countershaft gear G1, instead of information representing the second countershaft phase. The phase difference between the third countershaft gear G3 and the first countershaft gear G1 can be used instead of the third countershaft phase. Therefore, the table includes the information representing the phase difference between the third countershaft gear G3 and the first countershaft gear G1, instead of information representing the third countershaft phase.

In the table shown in FIG. 9, the information representing the phase difference between the second countershaft gear G2 and the first countershaft gear G1 is expressed by the number of teeth of the second countershaft gear G2. For example, in the embodiment, the number of teeth of the second countershaft gear G2 is 19 and the number of teeth of the first countershaft gear G1 is 17. Therefore, when the number of rotations of the first countershaft gear G1 is one, the second countershaft phase is smaller than the first countershaft phase by two teeth of the second countershaft gear G2. That is, the second countershaft gear G2 rotates less than the first countershaft gear G1 by two teeth of the second countershaft gear G2. In other words, the phase difference between the second countershaft gear G2 and the first countershaft gear G1 is −2 teeth of the second countershaft gear G2. Thus, the table shows that the information representing this phase difference is "−2 teeth".

In the table shown in FIG. 9, the information representing the phase difference between the third countershaft gear G3 and the first countershaft gear G1 is expressed by the number of teeth of the third countershaft gear G3. For example, in the embodiment, the number of teeth of the third countershaft gear G3 is 23 and the number of teeth of the first countershaft gear G1 is 17. Therefore, when the number of rotations of the first countershaft gear G1 is one, the third countershaft phase is smaller than the first countershaft phase by six teeth of the third countershaft gear G3. That is, the third countershaft gear G3 rotates less than the first countershaft gear G1 by six teeth of the third countershaft gear G3. In other words, the phase difference between the third countershaft gear G3 and the first countershaft gear G1 is −6 teeth of the third countershaft gear G3. Thus, the table shows that the information representing this phase difference is "−6 teeth".

The table shown in FIG. 9 may show other information representing the phase difference between the second countershaft gear G2 and the first countershaft gear G1, instead of the phase difference expressed by the number of teeth of the second countershaft gear G2. The table may also show other information representing the phase difference between the third countershaft gear G3 and the first countershaft gear G1, instead of the phase difference expressed by the number of teeth of the third countershaft gear G3. As the fourth correspondence information, other information representing the correspondence between the combination of the second countershaft phase and the third countershaft phase, and the number of rotations of the first countershaft gear G1, may be employed, instead of the table.

The derivation unit 363 derives the number of rotations of the first countershaft gear G1, using such fourth correspondence information. Specifically, the derivation unit 363 detects the number of rotations of the first countershaft gear G1 corresponding to the combination of the second countershaft phase and the third countershaft phase from the fourth correspondence information stored in advance in the memory 32 and thus derives this number of rotations.

Based on the derived number of rotations of the first countershaft gear G1 and the first countershaft phase, the derivation unit 363 derives the value of the number of rotations of the first countershaft gear G1 added up with the first countershaft phase, as the multiple rotation quantity of the first countershaft gear G1.

Here, the main shaft gear G0 rotates at an angular velocity that is the angular velocity of the first countershaft gear G1 multiplied by the number of teeth of the first countershaft gear G1 divided by the number of teeth of the main shaft gear G0. Therefore, the value of the multiple rotation quantity of the first countershaft gear G1 multiplied by the number of teeth of the first countershaft gear G1 divided by the number of teeth of the main shaft gear G0 coincides with the multiple rotation quantity of the main shaft gear G0. Also, the main shaft gear G0 makes one rotation as the teeth of the main shaft gear G0 moves by the number of teeth of the main shaft gear G0 from the starting point. Therefore, the phase of the main shaft gear G0 coincides with the multiple rotation quantity of the main shaft gear G0 mod the number of teeth of the main shaft gear G0. In other words, the phase of the main shaft gear G0 coincides with the number of teeth of the first countershaft gear G1 divided by the number of teeth of the main shaft gear G0 mod the number of teeth of the main shaft gear G0.

Thus, the derivation unit 363 derives the phase of the main shaft gear G0 as the second main shaft phase, based on the derived multiple rotation quantity of the first countershaft gear G1. That is, in step S330, the derivation unit 363 derives the phase of the main shaft gear G0 as the second main shaft phase, based on the three pieces of countershaft phase information acquired in step S320. In such a method for deriving the second main shaft phase, the role of the first countershaft gear G1 may be replaced by the role of the second countershaft gear G2 or may be replaced by the role of the third countershaft gear G3.

Figure 10:
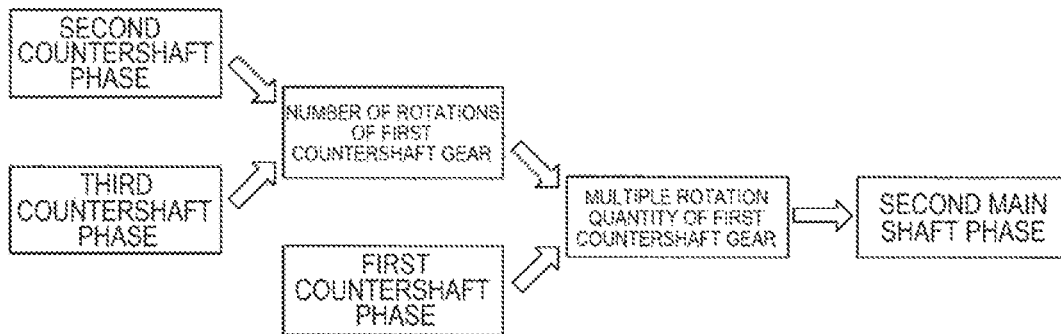
FIG. 10 shows an example of a flow to derive a second main shaft phase.

FIG. 10 shows an example of such a flow of deriving the second main shaft phase. As shown in FIG. 10, the second main shaft phase is derived based on the multiple rotation quantity of the first countershaft gear G1. The multiple rotation quantity of the first countershaft gear G1 is derived based on the first countershaft phase and the number of rotations of the first countershaft gear G1. The number of rotations of the first countershaft gear G1 is derived based on the second countershaft phase and the third countershaft phase.

After the processing of step S330, the determination unit 365 determines whether the third abnormality condition is satisfied or not (step S340). The third abnormality condition is that the first main shaft phase and the second main shaft phase do not coincide with each other, as described above. That is, the determination unit 365 determines whether the third abnormality condition is satisfied or not, based on the second main shaft phase derived in step S330.

When the determination unit 365 determines that the third abnormality condition is not satisfied (NO in step S340), the robot control unit 369 ends the processing of step S130, that is, the third processing. The processing to end the third processing in this case may be performed by a functional unit other than the robot control unit 369, of the functional units provided in the control unit 36.

Meanwhile, when the determination unit 365 determines that the third abnormality condition is satisfied (YES in step S340), the robot control unit 369 stops the first drive unit M1 (step S350). The processing of step S350 is similar to the processing of step S250 shown in FIG. 6 and therefore will not be described further.

Next, the reporting unit 371 reports information representing that the third abnormality condition is satisfied for the first drive unit M1 (step S360). The robot control unit 369 then ends the processing of step S130, that is, the third processing. At this time, the robot control unit 369 ends the processing without executing the rest of the processing of FIG. 5. At this time, the robot control unit 369 may also execute a flow for abnormality occurrence, for example, processing to record the abnormality.

The foregoing processing of step S330 is an example of the thirty-first processing. The foregoing processing of steps S340 to S350 is an example of the thirty-second processing. That is, the robot control device 30 performs the third processing including the thirty-first processing and the thirty-second processing. Thus, the robot control device 30 can restrain the robot 20 from malfunctioning.

The robot control device 30 derives the second main shaft phase based on the derived multiple rotation quantity of the first countershaft gear G1, separately from the first main shaft phase specified by the main shaft phase output unit S0, as the phase of the main shaft gear G0, as described above. This means that the robot control device 30 monitors that a phase different from the actual phase is derived as the phase of the main shaft gear G0, by the combination of the main shaft gear G0 and the first countershaft gear G1. That is, the robot control device 30 according to the embodiment performs monitoring based on this combination and thus restrains the robot 20 from malfunctioning due to the derivation of a multiple rotation quantity different from the actual multiple rotation quantity as the multiple rotation quantity of the main shaft gear G0 based on the information outputted from the encoder EC.

The robot control device 30 may be configured to monitor that a phase different from the actual phase is derived as the phase of the main shaft gear G0, by each of the combination of the main shaft gear G0 and the first countershaft gear G1, the combination of the main shaft gear G0 and the second countershaft gear G2, and the combination of the main shaft gear G0 and the third countershaft gear G3. That is, the robot control device 30 may be configured to monitor that a phase different from the actual phase is derived as the phase of the main shaft gear G0, by the combination of the main shaft gear G0 and the second countershaft gear G2, and to monitor that a phase different from the actual phase is derived as the phase of the main shaft gear G0, by the combination of the main shaft gear G0 and the third countershaft gear G3, based on processing similar to the processing in the flowchart shown in FIG. 8.

Processing of Step S170

Figure 11:
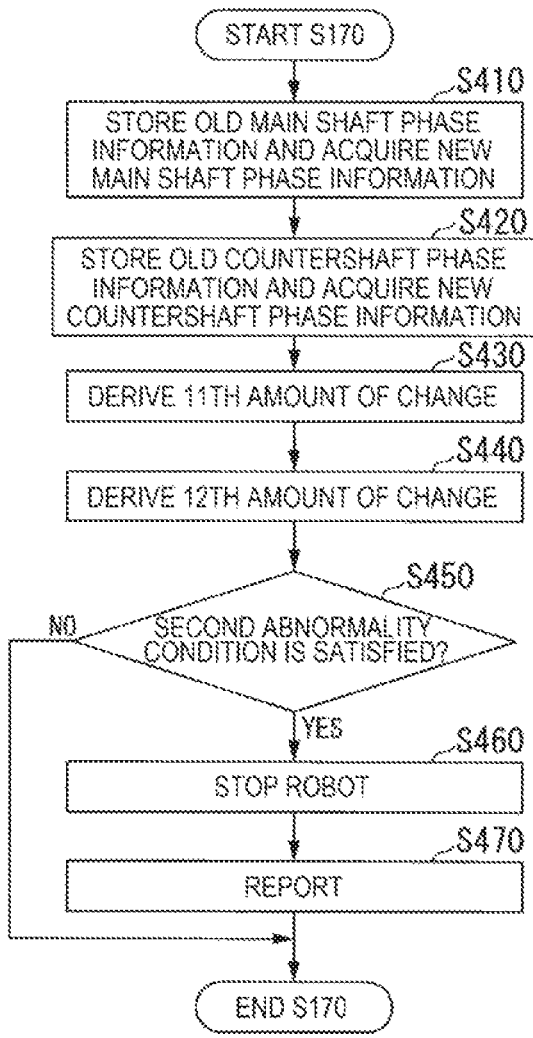
FIG. 11 shows an example of a flow of processing of step S170 shown in FIG. 5.

The processing of step S170 in FIG. 5, that is, the second processing, will now be described. FIG. 11 shows an example of the flow of the processing of step S170 shown in FIG. 5. The processing in the flowchart shown in FIG. 11 is performed for each of the four drive units M. Also, the processing in the flowchart shown in FIG. 11 is performed for each of the first to third countershaft gears G1 to G3 of the encoder EC in one drive unit M. Therefore, the processing of step S170 will be described, using the processing for the first countershaft gear G1 of the first drive unit M1 as an example.

The acquisition unit 361 stores the first main shaft phase information acquired immediately before by the acquisition unit 361, as old first main shaft phase information, into the memory 32. The acquisition unit 361 then acquires first main shaft phase information that is new, as new first main shaft phase information, from the main shaft phase output unit S0 of the encoder EC provided in the first drive unit M1 (step S410). When old first main shaft phase information is already stored in the memory 32, the acquisition unit 361 replaces the old first main shaft phase information stored in the memory 32 with old first main shaft phase information that is new.

Next, the acquisition unit 361 stores the first countershaft phase information acquired immediately before by the acquisition unit 361, as old first countershaft phase information, into the memory 32. The acquisition unit 361 then acquires first countershaft phase information that is new, as new first countershaft phase information, from the first phase output unit S1 of the encoder EC provided in the first drive unit M1 (step S420). When old first countershaft phase information is already stored in the memory 32, the acquisition unit 361 replaces the old first countershaft phase information stored in the memory 32 with old first countershaft phase information that is new.

Next, the derivation unit 363 derives an eleventh amount of change (step S430). The eleventh amount of change is the amount of change in the first countershaft phase derived based on the first main shaft phase.

The processing of step S430 will now be described. First, a method for deriving the eleventh amount of change will be described. When one gear g1 and another gear g2 mesh with each other, the following equation (1) holds:

$$\Delta\theta 2 = (h1/h2) \times \Delta\theta 1 \quad (1).$$

In the equation (1), $\Delta\theta 1$ is the amount of change in the phase of the gear g1, $\Delta\theta 2$ is the amount of change in the phase of the gear g2, h1 is the number of teeth of the gear g1, and h2 is the number of teeth of the gear g2.

Figure 12:
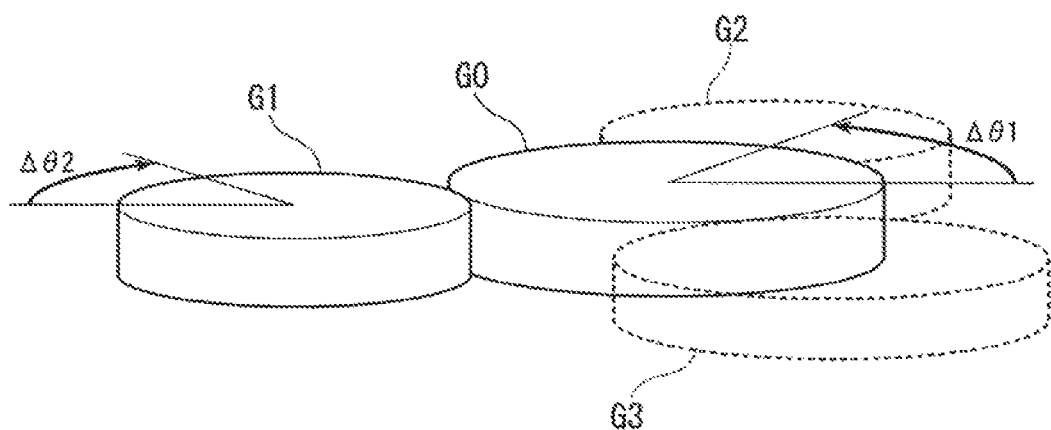
FIG. 12 shows an example of the relationship between a main shaft gear G0, a first countershaft gear G1, Δθ1, and Δθ2.

The derivation unit 363 can derive the amount of change in the first countershaft phase from the equation (1), by substituting the amount of change in the first main shaft phase for $\Delta\theta 1$, substituting the number of teeth of the main shaft gear G0 for h1, and substituting the number of teeth of the first countershaft gear G1 for h2. FIG. 12 shows an example of the relation between the main shaft gear G0, the first countershaft gear G1, $\Delta\theta 1$, and $\Delta\theta 2$. For example, when the amount of change in the first main shaft phase is 360 degrees in the embodiment, the derivation unit 363 derives approximately 423 degrees as the amount of change in the first countershaft phase, based on the equation (1). By such a method, the derivation unit 363 derives the amount of change in the first countershaft phase as the eleventh amount of change.

Next, the processing in which the derivation unit 363 derives the amount of change in the first main shaft phase will be described. The derivation unit 363 reads out, from the memory 32, the old first main shaft phase information stored in the memory 32. The derivation unit 363 derives the value of the first main shaft phase represented by the new first main shaft phase information acquired by the acquisition unit 361 in step S410 minus the first main shaft phase represented by the old first main shaft phase information thus read out, as the amount of change in the first main shaft phase. The derivation unit 363 substitutes the amount of change in the first main shaft phase thus derived, for $\Delta\theta1$ in the above equation, and thus derives the eleventh amount of change.

The eleventh amount of change derived by the derivation unit 363 when performing the processing of step S430 for the second countershaft gear G2 is an example of a twenty-first amount of change. The eleventh amount of change derived by the derivation unit 363 when performing the processing of step S430 for the third countershaft gear G3 is an example of a thirty-first amount of change.

After the processing of step S430, the derivation unit 363 derives a twelfth amount of change (step S440). The twelfth amount of change is the amount of change in the first countershaft phase derived based on the first countershaft phase. Specifically, the derivation unit 363 reads out, from the memory 32, the old first countershaft phase information stored in the memory 32. The derivation unit 363 the value of the first countershaft phase represented by the new first countershaft phase information the acquired by the acquisition unit 361 in step S420 minus the first countershaft phase represented by the old first countershaft phase information thus read out, as the twelfth amount of change. That is, this value is the amount of change in the first countershaft phase derived based on the first countershaft phase.

The twelfth amount of change derived by the derivation unit 363 when performing the processing of step S440 for the second countershaft gear G2 is an example of a twenty-second amount of change. The twelfth amount of change derived by the derivation unit 363 when performing the processing of step S440 for the third countershaft gear G3 is an example of a thirty-second amount of change.

Next, the determination unit 365 determines whether a second abnormality condition is satisfied or not (step S450). The second abnormality condition is that the eleventh amount of change and the twelfth amount of change do not coincide with each other. That is, the determination unit 365 determines whether the second abnormality condition is satisfied or not, based on the eleventh amount of change derived in step S430 and the twelfth amount of change derived in step S440.

When the determination unit 365 determines that the second abnormality condition is not satisfied (NO in step S450), the robot control unit 369 ends the processing of step S170, that is, the second processing. The processing to end the second processing in this case may be performed by a functional unit other than the robot control unit 369, of the functional units provided in the control unit 36.

Meanwhile, when the determination unit 365 determines that the second abnormality condition is satisfied (YES in step S450), the robot control unit 369 stops the first drive unit M1 (step S460). The processing of step S460 is similar to the processing of step S250 shown in FIG. 6 and therefore will not be described further.

Next, the reporting unit 371 reports information representing that the second abnormality condition is satisfied for the first drive unit M1 (step S470). The robot control unit 369 then ends the processing of step S170, that is, the second processing. At this time, the robot control unit 369 ends the processing without executing the rest of the processing of FIG. 5. At this time, the robot control unit 369 may also execute a flow for abnormality occurrence, for example, processing to record the abnormality.

In this way, processing using a table is not performed in the second processing. Therefore, in the second processing, the load of the processing performed by the derivation unit 363 is lower than in each of the first processing and the third processing. That is, since the robot control device 30 performs the second processing after performing the first round of the first processing and the third processing, the load of the processing performed by the robot control device 30 during the operation of the robot 20 can be made lower than when performing the first processing and the third processing.

The control unit 36 may be configured to be able to change one or both of the first predetermined time and the second predetermined time described above, according to an operation accepted by the robot control device 30 from the user or an operation of the robot 20 or the like.

The second processing performed for the encoder EC of one drive unit M may be performed for a part of the first to third countershaft gears G1 to G3, instead of being performed for each of the first to third countershaft gears G1 to G3 of the drive unit M. However, in this case, when an abnormality occurs about a countershaft gear that is not included in the part of the countershaft gears, the second processing cannot stop the drive unit M, and the information representing that the second abnormality condition is satisfied cannot be reported, either. Therefore, it is desirable that the second processing is performed for each of the first to third countershaft gears G1 to G3 of the drive unit M.

The relationship expressed by the equation (1) also holds when the gear g1 and the gear g2 mesh with each other via another gear g3. For example, the first countershaft gear G1 and the second countershaft gear G2 mesh with each other via the main shaft gear G0. Therefore, the amount of change in the first countershaft phase and the amount of change in the second countershaft phase satisfy the equation (1). Also, for example, the second countershaft gear G2 and the third countershaft gear G3 mesh with each other via the main shaft gear G0. Therefore, the amount of change in the second countershaft phase and the amount of change in the third countershaft phase satisfy the equation (1). Also, for example, the third countershaft gear G3 and the first countershaft gear G1 mesh with each other via the main shaft gear G0. Therefore, the amount of change in the third countershaft phase and the amount of change in the first countershaft phase satisfy the equation (1).

Due to such circumstances, the second processing may include processing to derive a forty-first amount of change, processing to derive a forty-second amount of change, processing to determine whether a fifth abnormality condition is satisfied or not, processing to stop the drive unit M when the fifth abnormality condition is satisfied, and processing to report that the fifth abnormality condition is satisfied in that case. The forty-first amount of change is the amount of change in the first countershaft phase derived based on the second countershaft phase. The forty-second amount of change is the amount of change in the first countershaft phase derived based on the first countershaft phase. The fifth abnormality condition is that the forty-first amount of change and the forty-second amount of change do not coincide with each other. The method for deriving the forty-first amount of change is similar to the method for deriving the eleventh amount of change with the main shaft gear G0 replaced by the second countershaft gear G2 and therefore will not be described further.

The second processing may also include processing to derive a fifty-first amount of change, processing to derive a fifty-second amount of change, processing to determine whether a sixth abnormality condition is satisfied or not, processing to stop the drive unit M when the sixth abnormality condition is satisfied, and processing to report that the sixth abnormality condition is satisfied in that case. The fifty-first amount of change is the amount of change in the second countershaft phase derived based on the third countershaft phase. The fifty-second amount of change is the amount of change in the second countershaft phase derived based on the second countershaft phase. The sixth abnormality condition is that the fifty-first amount of change and the fifty-second amount of change do not coincide with each other. The method for deriving the fifty-first amount of change is similar to the method for deriving the eleventh amount of change with the main shaft gear G0 replaced by the third countershaft gear G3 and with the first countershaft gear G1 replaced by the second countershaft gear G2 and therefore will not be described further.

The second processing may also include processing to derive a sixty-first amount of change, processing to derive a sixty-second amount of change, processing to determine whether a seventh abnormality condition is satisfied or not, processing to stop the drive unit M when the seventh abnormality condition is satisfied, and processing to report that the seventh abnormality condition is satisfied in that case. The sixty-first amount of change is the amount of change in the third countershaft phase derived based on the first countershaft phase. The sixty-second amount of change is the amount of change in the third countershaft phase derived based on the third countershaft phase. The seventh abnormality condition is that the sixty-first amount of change and the sixty-second amount of change do not coincide with each other. The method for deriving the sixty-first amount of change is similar to the method for deriving the eleventh amount of change with the main shaft gear G0 replaced by the first countershaft gear G1 and with the first countershaft gear G1 replaced by the third countershaft gear G3 and therefore will not be described further.

Modification Examples of Embodiment

Modification examples of the embodiment will now be described.

The encoder EC may have one or more countershaft gears in addition to the main shaft gear G0, the first countershaft gear G1, the second countershaft gear G2, and the third countershaft gear G3. In this case, the one or more countershaft gears are provided in the encoder EC in such a way as to mesh with the main shaft gear G0 and not to mesh with each of the first to third countershaft gears G1 to G3.

For example, the encoder EC may have a fourth countershaft gear G4, not illustrated, in addition to the main shaft gear G0, the first countershaft gear G1, the second countershaft gear G2, and the third countershaft gear G3. In this case, in the encoder EC, the number of combinations of two countershaft gears that can be selected from among the four countershaft gears is six. In this case, in the encoder EC, the number of combinations of three countershaft gears that can be selected from among the four countershaft gears is four.

On the assumption that each of these ten combinations is referred to as a system, the number of rotations of the main shaft gear G0 can be derived for each system by a method similar to the method for deriving each of the first to third numbers of rotations in the first processing. In such a case, the control unit 36 determines whether two or more of the numbers of rotations for the respective systems do not coincide with each other, based on the number of rotations for each system. Thus, the robot control device 30 can perform processing similar to the first processing and can restrain the robot 20 from malfunctioning.

The control unit 36 may be configured to specify a number of rotations that coincides with a majority of the numbers of the respective systems, based on the number of rotations for each system. In this case, the control unit 36 can specify a countershaft gear about which an abnormality has occurred, of the first to fourth countershaft gears G1 to G4. Thus, the control unit 36 can determine whether the operation of the robot 20 needs to be continued or not, and can restrain the robot 20 from malfunctioning.

The number of teeth of the fourth countershaft gear G4 may be the same as the number of teeth of the main shaft gear G0 or may be the same as the number of teeth of one of the first to third countershaft gears G1 to G3.

The main shaft phase output unit S0 may be a functional unit which derives a phase of the main shaft gear G0 based on a mathematical model and estimates the derived phase as the first main shaft phase, of the functional units provided in the control unit 36, instead of the sensor detecting the first main shaft phase. In this case, the encoder EC may be configured with the sensor or may be configured without the sensor. The mathematical model is a model based on an equation of motion describing a rotating motion between the rotary shaft of the drive unit M and a load attached to the rotary shaft. The mathematic model is a model which estimates a phase of the rotary shaft and outputs the estimated phase, when a command current to rotate the rotary shaft is inputted to the drive unit M. The mathematical model may include a model to derive the load or may not include a model to derive the load. The mathematical model may be a model based on another derivation method such as a model using a table, instead of the model based on the equation of motion.

When the main shaft phase output unit S0 is such a mathematical model, the control unit 36 performs the first processing, based on the first main shaft phase outputted from the main shaft phase output unit S0. That is, even in this case, the robot control device 30 can restrain the robot 20 from malfunctioning by the first processing. The mathematical model may use, as an input, information that can specify the phase of the main shaft gear G0 acquired from another sensor detecting this information, instead of using the command current as an input.

A part or all of the first to seventh abnormality conditions may or may not allow a margin of error.

Figure 13:
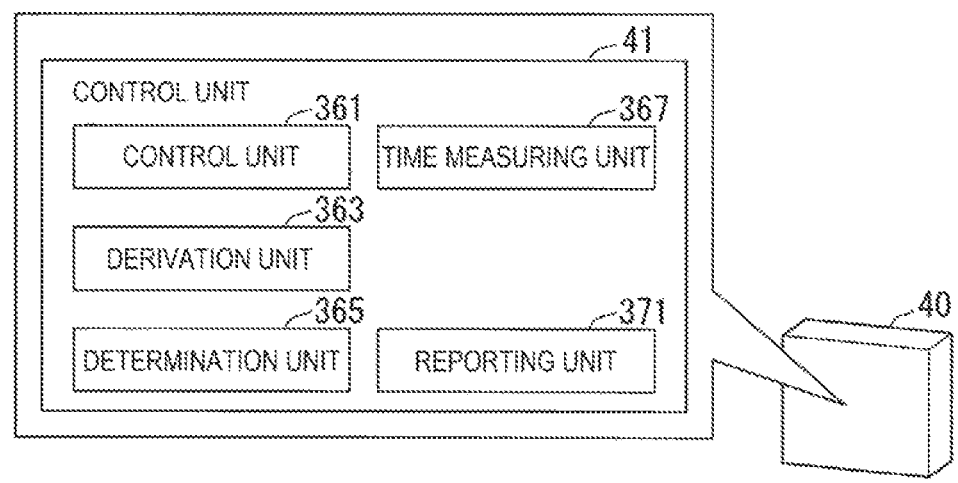
FIG. 13 shows an example of the functional configuration of a control unit 41.

As described above, the function of performing the processing in the flowchart shown in FIG. 5, of the functions provided in the control unit 36, may be provided in the robot 20, the information processing device 40, the encoder EC or the like. For example, when this function is provided in the information processing device 40, the information processing device 40 has, for example, a processor, and a control unit 41 provided in the information processing device 40 has the acquisition unit 361, the derivation unit 363, the determination unit 365, the time measuring unit 367, and the reporting unit 371, as shown in FIG. 13. FIG. 13 shows an example of the functional configuration of the control unit

41. Also, the control unit 41 provided in the information processing device 40 may have the acquisition unit 361, the derivation unit 363, and the determination unit 365, without having the time measuring unit 367 and the reporting unit 371. Meanwhile, for example, when this function is provided in the encoder EC, the encoder EC has, for example, a processor, and a control unit provided in the encoder EC has the acquisition unit 361, the derivation unit 363, the determination unit 365, the time measuring unit 367, and the reporting unit 371. Also, the control unit provided in the encoder EC may have the acquisition unit 361, the derivation unit 363, and the determination unit 365, without having the time measuring unit 367 and the reporting unit 371. By these measures, this function can be executed simply by using the information processing device 40 or the encoder EC having this function, even when the robot control device 30 or the like does not have this function. Moreover, this function may be split among the robot 20, the robot control device 30, the information processing device 40, the encoder EC and the like. For example, when this function is provided in the encoder EC and the robot control device 30, the encoder EC may have the acquisition unit 361 and the derivation unit 363, and the robot control device 30 may have the determination unit 365, the time measuring unit 367, and the reporting unit 371.

Figure 14:
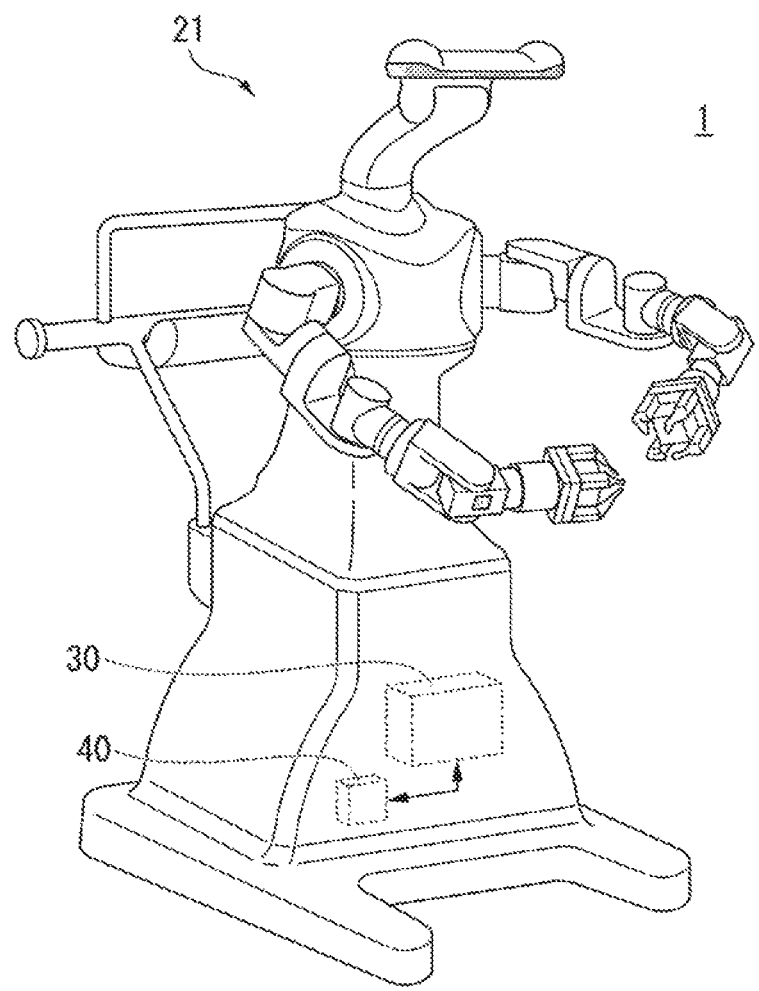
FIG. 14 shows an example of the configuration of the robot system 1 having a robot 21 instead of a robot 20.

The robot control device 30 may be provided for a robot that is different from the robot 20, as described above. For example, the robot control device 30 may be provided in a robot 21 shown in FIG. 14. FIG. 14 shows an example of the configuration of the robot system 1 having the robot 21 instead of the robot 20.

In the example shown in FIG. 14, the robot 21 has the robot control device 30 and the information processing device 40 built inside.

The robot 21 is the above-described dual-arm robot. As shown in FIG. 14, the robot 21 has two arms.

Each of the two arms of the robot 21 is provided with seven joints. Each of the seven joints is provided with the drive unit M. In FIG. 14, the drive unit M is omitted in order to simplify the illustration. One or both of the two arms may be provided fewer than seven joints or may be provided with more than seven joints.

Thus, the robot control device 30, even when built in the robot 21, can perform at least one of the first processing and the third processing and thus can restrain the robot from malfunctioning.

As described above, the robot system according to the embodiment includes: a robot having a main shaft gear attached to a rotary shaft of a drive unit, a first countershaft gear meshing with the main shaft gear, a second countershaft gear meshing with the main shaft gear, and a third countershaft gear meshing with the main shaft gear; and a main shaft phase output unit outputting a phase of the main shaft gear as a first main shaft phase. The robot system derives the phase of the main shaft gear as a second main shaft phase, based on a phase of the first countershaft gear, a phase of the second countershaft gear, and a phase of the third countershaft gear, and performs processing to stop the drive unit when the first main shaft phase and the second main shaft phase do not coincide with each other. Thus, the robot system can determine whether a number of rotations different from the actual number of rotations is derived or not, and can restrain the robot from malfunctioning. In the foregoing example, the robot system is the robot system 1. In the foregoing example, the drive unit is the drive unit M. In the foregoing example, the main shaft gear is the main shaft gear G0. In the foregoing example, the first countershaft gear is the first countershaft gear G1. In the foregoing example, the second countershaft gear is the second countershaft gear G2. In the foregoing example, the third countershaft gear is the first countershaft gear G3. In the foregoing example, the robot is the robot 20. In the foregoing example, the main shaft phase output unit is the main shaft phase output unit S0.

The robot system may perform the processing during the period until the robot starts moving after the power supply of the robot is turned on.

The robot system may have a first phase output unit outputting the phase of the first countershaft gear. The robot system may derive an amount of change in the phase of the first countershaft gear as an eleventh amount of change, based on the first main shaft phase outputted from the main shaft phase output unit, derive an amount of change in the phase of the first countershaft gear outputted from the first phase output unit as a twelfth amount of change, and stop the drive unit when the eleventh amount of change and the twelfth amount of change do not coincide with each other, as second processing. The robot system may perform the second processing after the first round of the processing is performed. In the foregoing example, the first phase output unit is the first phase output unit S1.

The robot system may also have a second phase output unit outputting the phase of the second countershaft gear, and a third phase output unit outputting the phase of the third countershaft gear. The second processing may further include deriving an amount of change in the phase of the second countershaft gear as a twenty-first amount of change, based on the first main shaft phase outputted from the main shaft phase output unit, deriving an amount of change in the phase of the third countershaft gear as a thirty-first amount of change, based on the first main shaft phase outputted from the main shaft phase output unit, deriving an amount of change in the phase of the second countershaft gear outputted from the second phase output unit as a twenty-second amount of change, deriving an amount of change in the phase of the third countershaft gear outputted from the third phase output unit as a thirty-second amount of change, stopping the drive unit when the twenty-first amount of change and the twenty-second amount of change do not coincide with each other, and stopping the drive unit when the thirty-first amount of change and the thirty-second amount of change do not coincide with each other. In the foregoing example, the second phase output unit is the second phase output unit S2. In the foregoing example, the third phase output unit is the third phase output unit S3.

In the robot system, the main shaft phase output unit may output the first main shaft phase based on a mathematical model.

The robot system may determine whether a predetermined condition is satisfied after the first round of the processing is performed, and the robot system may perform the processing when the predetermined condition is satisfied. In the foregoing example, the predetermined condition is that the first predetermined time passes.

In the robot system, the predetermined condition may be that a predetermined time passes. In the foregoing example, the predetermined time is the first predetermined time.

In the robot system, the robot may further include a fourth countershaft gear. In the foregoing example, the fourth countershaft gear is the fourth countershaft gear G4.

In the robot system, the robot may have a power shutoff unit shutting off electricity supply to the robot. The power shutoff unit may shut off the electricity supply to the robot when stopping the drive unit.

In the robot system, the processing may further include reporting information representing that the first main shaft phase and the second main shaft phase do not coincide with each other when the first main shaft phase and the second main shaft phase do not coincide with each other.

Also, the robot system according to the embodiment is a robot system including: a robot having a main shaft gear attached to a rotary shaft of a drive unit, a first countershaft gear meshing with the main shaft gear, a second countershaft gear meshing with the main shaft gear, and a third countershaft gear meshing with the main shaft gear. A number of teeth of the main shaft gear, a number of teeth of the first countershaft gear, a number of teeth of the second countershaft gear, and a number of teeth of the third countershaft gear are integers having no greatest common divisor other than 1. As first processing, a first number of rotations, which is a number of rotations of the main shaft gear, is derived based on a phase of the first countershaft gear and a phase of the second countershaft gear, and a second number of rotations, which is a number of rotations of the main shaft gear, is derived based on the phase of the second countershaft gear and a phase of the third countershaft gear, and the drive unit is stopped when the first number of rotations and the second number of rotations do not coincide with each other. Thus, the robot system can determine whether a phase different from the actual phase is detected or not, and can restrain the robot from malfunctioning. In the foregoing example, the robot system is the robot system 1. In the foregoing example, the drive unit is the drive unit M. In the foregoing example, the main shaft gear is the main shaft gear G0. In the foregoing example, the first countershaft gear is the first countershaft gear G1. In the foregoing example, the second countershaft gear is the second countershaft gear G2. In the foregoing example, the third countershaft gear is the first countershaft gear G3. In the foregoing example, the robot is the robot 20.

In the robot system, the first processing may include deriving a third number of rotations, which is a number of rotations of the main shaft gear, based on the phase of the third countershaft gear and the phase of the first countershaft gear, and stopping the drive unit when the first number of rotations, the second number of rotations, and the third number of rotations do not coincide with each other.

In the robot system, the first processing may further include reporting information representing that the first number of rotations, the second number of rotations, and the third number of rotations do not coincide with each other when the first number of rotations, the second number of rotations, and the third number of rotations do not coincide with each other.

The robot system may perform the first processing during the period until the robot starts moving after the power supply of the robot is turned on.

The robot system may have a main shaft phase output unit outputting the phase of the main shaft gear as a first main shaft phase, and a first phase output unit outputting the phase of the first countershaft gear. The robot system may derive an amount of change in the phase of the first countershaft gear as an eleventh amount of change, based on the first main shaft phase outputted from the main shaft phase output unit, derive an amount of change in the phase of the first countershaft gear outputted from the first phase output unit as a twelfth amount of change, and stop the drive unit when the eleventh amount of change and the twelfth amount of change do not coincide with each other, as second processing. The robot system may perform the second processing after the first round of the first processing is performed. In the foregoing example, the main shaft phase output unit is the main shaft phase output unit S0. In the foregoing example, the first phase output unit is the first phase output unit S1.

The robot system may also have a second phase output unit outputting the phase of the second countershaft gear, and a third phase output unit outputting the phase of the third countershaft gear. The second processing may further include deriving an amount of change in the phase of the second countershaft gear as a twenty-first amount of change, based on the first main shaft phase outputted from the main shaft phase output unit, deriving an amount of change in the phase of the third countershaft gear as a thirty-first amount of change, based on the first main shaft phase outputted from the main shaft phase output unit, deriving an amount of change in the phase of the second countershaft gear outputted from the second phase output unit as a twenty-second amount of change, deriving an amount of change in the phase of the third countershaft gear outputted from the third phase output unit as a thirty-second amount of change, stopping the drive unit when the twenty-first amount of change and the twenty-second amount of change do not coincide with each other, and stopping the drive unit when the thirty-first amount of change and the thirty-second amount of change do not coincide with each other. In the foregoing example, the second phase output unit is the second phase output unit S2. In the foregoing example, the third phase output unit is the third phase output unit S3.

In the robot system, the main shaft phase output unit may output the first main shaft phase based on a mathematical model.

The robot system may determine whether a predetermined condition is satisfied after the first round of the first processing is performed, and the robot system may perform the first processing when the predetermined condition is satisfied. In the foregoing example, the predetermined condition is that the first predetermined time passes.

In the robot system, the predetermined condition may be that a predetermined time passes. In the foregoing example, the predetermined time is the first predetermined time.

In the robot system, the robot may further include a fourth countershaft gear. In the foregoing example, the fourth countershaft gear is the fourth countershaft gear G4.

In the robot system, the robot may have a power shutoff unit shutting off electricity supply to the robot. The power shutoff unit may shut off the electricity supply to the robot when stopping the drive unit.

The embodiment of the present disclosure has been described in detail with reference to the drawings. However, the present disclosure is not limited to the specific configuration of the embodiment. Any change, replacement, deletion or the like can be made without departing from the spirit and scope of the present disclosure.

A program for implementing a function of an arbitrary component of the foregoing device may be recorded in a computer-readable recording medium, and the program may be read and executed by a computer system. The device is, for example, the robot 20, the robot 21, the robot control device 30, the information processing device 40, the encode EC or the like. The "computer system" in this case includes an OS (operating system) and hardware such as a peripheral device. The "computer-readable recording medium" is a portable medium such as a flexible disk, magneto-optical disk, ROM, or CD (compact disk)-ROM, or a storage device such as a hard disk built in the computer system. The "computer-readable recording medium" also includes a recording medium holding a program for a predetermined time, such as a volatile memory inside a computer system serving as a server or client when the program is transmitted via a network such as the internet or via a communication line such as a telephone line.

The program may be transmitted from a computer system having this program stored in a storage device or the like to another computer system via a transmission medium or via a transmission wave in the transmission medium. The "transmission medium" transmitting the program is a medium having the function of transmitting information, such as a network like the internet or a communication line like a telephone line.

The program may be for implementing a part of the foregoing function. Also, the program may be a program that can implement the foregoing function when combined with a program already recorded in the computer system, that is, a so-called a differential file or differential program.

What is claimed is:

1. A robot system comprising:
    a robot having a main shaft gear attached to a rotary shaft of a drive unit, a first countershaft gear meshing with the main shaft gear, a second countershaft gear meshing with the main shaft gear, and a third countershaft gear meshing with the main shaft gear; and
    a main shaft phase output unit outputting a phase of the main shaft gear as a first main shaft phase, wherein
    a phase of the main shaft gear is derived as a second main shaft phase, based on a phase of the first countershaft gear, a phase of the second countershaft gear, and a phase of the third countershaft gear, and
    processing to stop the drive unit is performed when the first main shaft phase and the second main shaft phase do not coincide with each other.

2. The robot system according to claim 1, wherein the processing is performed during a period until the robot starts moving after a power supply of the robot is turned on.

3. The robot system according to claim 1, further comprising
    a first phase output unit outputting the phase of the first countershaft gear, wherein
    as second processing,
    an amount of change in the phase of the first countershaft gear is derived as an eleventh amount of change, based on the first main shaft phase outputted from the main shaft phase output unit,
    an amount of change in the phase of the first countershaft gear outputted from the first phase output unit is derived as a twelfth amount of change, and
    the drive unit is stopped when the eleventh amount of change and the twelfth amount of change do not coincide with each other, and
    the second processing is performed after a first round of the processing is performed.

4. The robot system according to claim 3, further comprising:
    a second phase output unit outputting the phase of the second countershaft gear; and
    a third phase output unit outputting the phase of the third countershaft gear, wherein
    the second processing further includes
    deriving an amount of change in the phase of the second countershaft gear as a twenty-first amount of change, based on the first main shaft phase outputted from the main shaft phase output unit,
    deriving an amount of change in the phase of the third countershaft gear as a thirty-first amount of change, based on the first main shaft phase outputted from the main shaft phase output unit,
    deriving an amount of change in the phase of the second countershaft gear outputted from the second phase output unit, as a twenty-second amount of change,
    deriving an amount of change in the phase of the third countershaft gear outputted from the third phase output unit, as a thirty-second amount of change,
    stopping the drive unit when the twenty-first amount of change and the twenty-second amount of change do not coincide with each other, and
    stopping the drive unit when the thirty-first amount of change and the thirty-second amount of change do not coincide with each other.

5. The robot system according to claim 3, wherein the main shaft phase output unit outputs the first main shaft phase, based on a mathematical model.

6. The robot system according to claim 1, wherein whether a predetermined condition is satisfied is determined after a first round of the first processing is performed, and
    the first processing is performed when the predetermined condition is satisfied.

7. The robot system according to claim 6, wherein the predetermined condition is that a predetermined passes.

8. The robot system according to claim 1, wherein the robot further includes a fourth countershaft gear.

9. The robot system according to claim 1, wherein the robot has a power shutoff unit shutting off electricity supply to the robot, and
    the power shutoff unit shuts off the electricity supply to the robot when stopping the drive unit.

10. The robot system according to claim 1, wherein the processing further includes
    reporting information representing that the first main shaft phase and the second main shaft phase do not coincide with each other when the first main shaft phase and the second main shaft phase do not coincide with each other.

11. A robot control method for controlling a robot having a main shaft gear attached to a rotary shaft of a drive unit, a first countershaft gear meshing with the main shaft gear, a second countershaft gear meshing with the main shaft gear, and a third countershaft gear meshing with the main shaft gear, the method comprising:
    outputting a phase of the main shaft gear as a first main shaft phase;
    deriving a phase of the main shaft gear as a second main shaft phase, based on a phase of the first countershaft gear, a phase of the second countershaft gear, and a phase of the third countershaft gear; and
    performing processing to stop the drive unit when the first main shaft phase and the second main shaft phase do not coincide with each other.

12. A robot system comprising:
    an encoder having a main shaft gear, a first countershaft gear, a second countershaft gear, and a third countershaft gear;
    a robot having the encoder;
    a control unit; and
    a main shaft phase output unit outputting a phase of the main shaft gear as a first main shaft phase, wherein the control unit is configured to execute a command to perform third processing, and the third processing includes processing to derive a phase of the main shaft gear as a second main shaft phase, based on a phase of the first countershaft gear, a phase of the second countershaft gear, and a phase of the third countershaft gear, and processing to stop the robot when the first main shaft phase and the second main shaft phase do not coincide with each other.

\* \* \* \* \*